United States Patent
Phillips

(10) Patent No.: US 8,925,825 B2
(45) Date of Patent: Jan. 6, 2015

(54) IDENTIFICATION TOKEN AND METHOD OF MAKING IDENTIFICATION TOKEN

(75) Inventor: Simon Phillips, York (GB)

(73) Assignee: MasterCard International Incorporated, Purchase, NY (US)

( * ) Notice: Subject to any disclaimer, the term of this patent is extended or adjusted under 35 U.S.C. 154(b) by 1113 days.

(21) Appl. No.: 12/897,425

(22) Filed: Oct. 4, 2010

(65) Prior Publication Data

US 2011/0017836 A1  Jan. 27, 2011

Related U.S. Application Data

(63) Continuation of application No. 11/852,712, filed on Sep. 10, 2007, now Pat. No. 7,837,123.

(51) Int. Cl.
*G06K 19/067* (2006.01)
*G06K 19/077* (2006.01)
*G06Q 20/10* (2012.01)

(52) U.S. Cl.
CPC ........ *G06K 19/07749* (2013.01); *G06Q 20/105* (2013.01); *G06K 19/07769* (2013.01); *G06K 19/07739* (2013.01)
USPC .......................................... 235/492; 235/486

(58) Field of Classification Search
USPC .......................................... 235/492, 487, 486
See application file for complete search history.

(56) References Cited

U.S. PATENT DOCUMENTS

| | | | |
|---|---|---|---|
| 5,585,787 A | 12/1996 | Wallerstein | |
| 5,955,961 A | 9/1999 | Wallerstein | |
| 6,315,195 B1 | 11/2001 | Ramachandran | |
| 6,353,811 B1 | 3/2002 | Weissman | |
| 6,561,432 B1 | 5/2003 | Vedder et al. | |
| 6,631,849 B2 | 10/2003 | Blossom | |
| 6,715,679 B1 | 4/2004 | Infosino | |
| 6,764,005 B2 | 7/2004 | Cooper | |
| 6,766,952 B2 | 7/2004 | Luu | |
| 6,863,220 B2 | 3/2005 | Selker | |
| 6,978,940 B2 | 12/2005 | Luu | |
| 7,012,504 B2 | 3/2006 | Tuttle | |

(Continued)

FOREIGN PATENT DOCUMENTS

| | | |
|---|---|---|
| WO | 98/33193 A1 | 7/1998 |
| WO | 99/38173 A1 | 7/1999 |
| WO | 00/79546 A1 | 12/2000 |

OTHER PUBLICATIONS

International Standard, "Identification cards—Physical Characteristics", ISO/IEC 7810, Third Edition, Nov. 1, 2003, 18pgs.

(Continued)

*Primary Examiner* — Daniel Hess
(74) *Attorney, Agent, or Firm* — Buckley, Maschoff & Talwalkar LLC

(57) ABSTRACT

In accordance with some embodiments, a method includes enabling operation of an RFID integrated circuit of a first card in an identification token using a first switch; and enabling operation of an RFID integrated circuit of a second card in an identification token using a second switch. In accordance with some embodiments, an identification token includes: a first card including an RFID integrated circuit; a second card including an RFID integrated circuit; a first switch to enable operation of the RFID integrated circuit of the first card; and a second switch to enable operation of the RFID integrated circuit of the second card.

21 Claims, 22 Drawing Sheets

(56) References Cited

U.S. PATENT DOCUMENTS

| | | | |
|---|---|---|---|
| 7,143,419 | B2 | 11/2006 | Fischer et al. |
| 8,639,291 | B1* | 1/2014 | Gailloux et al. .............. 455/558 |
| 2003/0132301 | A1 | 7/2003 | Selker |
| 2004/0124248 | A1 | 7/2004 | Selker |
| 2004/0223305 | A1 | 11/2004 | Amiot et al. |
| 2005/0258245 | A1 | 11/2005 | Bates et al. |
| 2006/0137464 | A1 | 6/2006 | Baudendistel |
| 2008/0011859 | A1 | 1/2008 | Phillips |
| 2008/0035740 | A1 | 2/2008 | Tanner |
| 2008/0054078 | A1 | 3/2008 | Tanner |
| 2008/0061148 | A1 | 3/2008 | Tanner |
| 2008/0061149 | A1 | 3/2008 | Tanner |
| 2008/0061150 | A1 | 3/2008 | Phillips |
| 2008/0061151 | A1 | 3/2008 | Phillips |
| 2008/0121707 | A1 | 5/2008 | Phillips et al. |
| 2008/0165006 | A1 | 7/2008 | Phillips |
| 2009/0065575 | A1 | 3/2009 | Phillips et al. |
| 2009/0100511 | A1 | 4/2009 | Phillips et al. |
| 2009/0272815 | A1 | 11/2009 | Tanner et al. |

OTHER PUBLICATIONS

"The Design of a Smart Card Interface Device: Chapter 5—Smart Card Protocols and ISO 7816-4", Retrieved Feb. 22, 2007. Retrieved from URL: http://www.cs.uct.ac.za/Research/DNA/SOCS/rchap5.html, 10pgs.

Jay MacDonald, "Calling Dick Tracy: Credit card watches debut", Mar. 24, 2009, Credit Cards.com, 2pgs.

Leslie Berlin, "Cellphones as Credits? Americans Must Wait", Jan. 24, 2009, The New York Times, [Retrieved Jan. 26, 2009]. Retrieved from URL: http://www.nytimes.com/2009/01/25/business/25proto.html?_r=1&em, 3pgs.

"Speedpass and Timex offer payments-by-wristwatch", Dec. 10, 2002, [Retrieved Mar. 31, 2009]. Retrieved from URL: http://www.finextra.com/fullstory.asp?id=7530, 2pgs.

"JCB pilots contactless payments", Apr. 1, 2004, [Retrieved Mar. 31, 2009]. Retrieved from URL: http://www.finextra.com/fullstory.asp?id=11549, 2pgs.

"JCB delivers contactless Offica service over Casio wrist watch", Jun. 14, 2004, [Retrieved Mar. 31, 2009]. Retrieved from URL: http://www.finextra.com/fullstory.asp?id=11994, 2pgs.

"MasterCard launches OneSmart Paypass", Nov. 2, 2004, [Retrieved Mar. 31, 2009]. Retrieved from URL: http://www.finextra.com/fullstory.asp?id=12788, 2pgs.

"Visa launches contactless payments system in US", Feb. 25, 2005, [Retrieved Mar. 31, 2009]. Retrieved from URL: http://www.finextra.com/fullstory.asp?id=13291, 2pgs.

"Contact sports fans go contactless with MasterCard PayPass", Feb. 22, 2005, [Retrieved Mar. 31, 2009]. Retrieved from URL: http://www.finextra.com/fullstory.asp?id=13291, 2pgs.

Ian Rowley (in Tokyo), "$5,000? Put It on My Cell", Jun. 6, 2005, Asian Business, Business Week, [Retrieved Mar. 31, 2009]. Retrieved from URL: http://www.businessweek.com/print/magazine/content/05_23/b3936060.htm?chan=gl, 2pgs.

"Citibank to roll out MasterCard PayPass contactless keyring", Aug. 25, 2005, [Retrieved Mar. 31, 2009]. Retrieved from URL: http://www.finextra.com/fullstory.asp?id=14154, 2pgs.

Michael Fitzgerald, "Use your Cell Phone Instead of Your Credit Card", Monday, Sep. 19, 2005, PC World Communications, Inc., 2ps.

"Chinatrust releases PayPass-enabled wrist watch", Jun. 7, 2006, [Retrieved Mar. 31, 2009]. Retrieved from URL: http://www.finextra.com/fullstory.asp?id=15406, 2pgs.

"Turkey's Garanti Bank to issue PayPass wrist watch", May 8, 2007, [Retrieved Mar. 31, 2009]. Retrieved from URL: http://www.finextra.com/fullstory.asp?id=16902, 2pgs.

"Turkey gets wristwatch with built-in credit card", May 11, 2007, [Retrieved Mar. 30, 2009]. Retrieved from URL: http://www.wristdreams.com/archives/2007/05/turkey_gets_wri.html, 4pgs.

"Wristwatch Equipped With a Built-In Credit Card", Thursday, May 17, 2007, [Retrieved Mar. 30, 2009]. Retrieved from URL: http://www.crookedbrains.net/2007/05/wristwatch-equipped-with-built-in.html, 4pgs.

"Wristwatch With Built-In Credit Card", Saturday, May 26th, 2007, [Retrieved Mar. 30, 2009]. Retrieved from URL: http://www.funniestgadgets.com/2007/05/26/wristwatch-with-built-in-credit-card/, 3pgs.

Karen Bruno, "Artist peddling designs for your credit card", Aug. 8, 2007, [Retrieved Mar. 31, 2009]. Retrieved from URL: http://www.creditcards.com/credit-card-news/credit-card-designs-and-covers-1273.php, 3pgs.

"Credit Card Rings (1964)", Thursday, Sep. 13, 2007, Paleo-Future, [Retrieved Mar. 30, 2009]. Retrieved from URL: http://www.paleofuture.com/blog/2007/9/14/credit-card-rings-1964.html, 5pgs.

"Altair unveils pre-paid contactless PayPass wrist watch", Jun. 27, 2008, [Retrieved Mar. 31, 2009]. Retrieved from URL: http://www.finextra.com/fullstory.asp?id=18654, 3pgs.

* cited by examiner

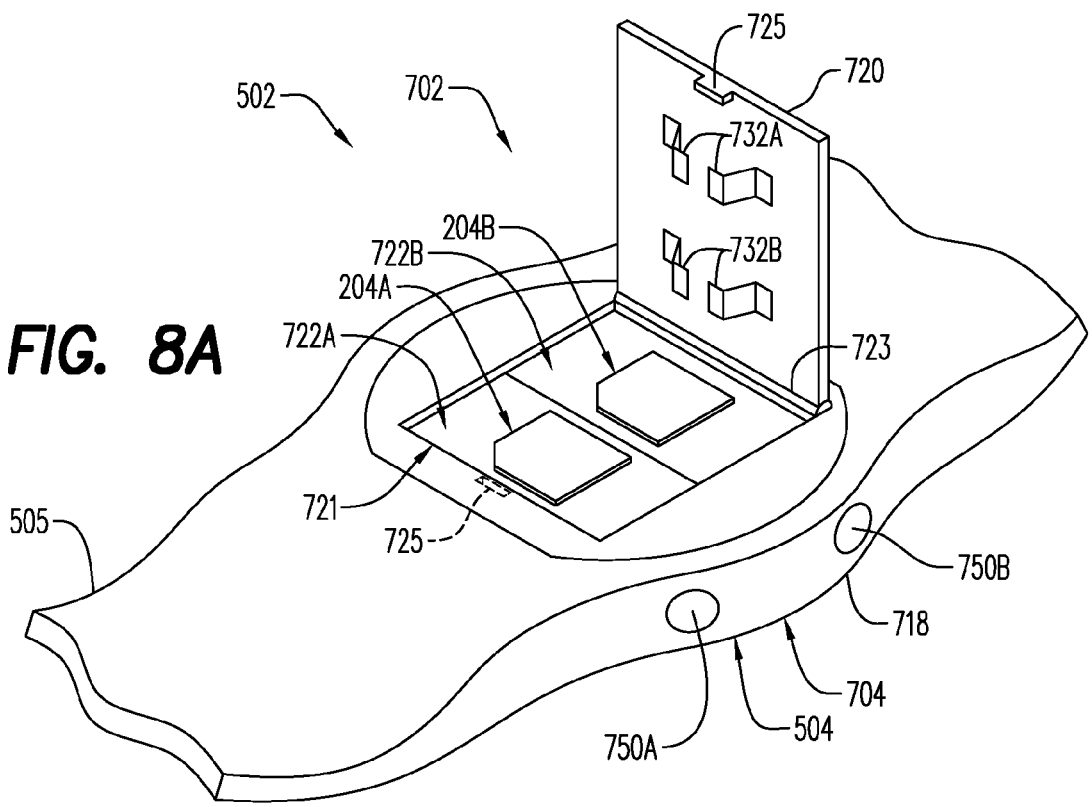
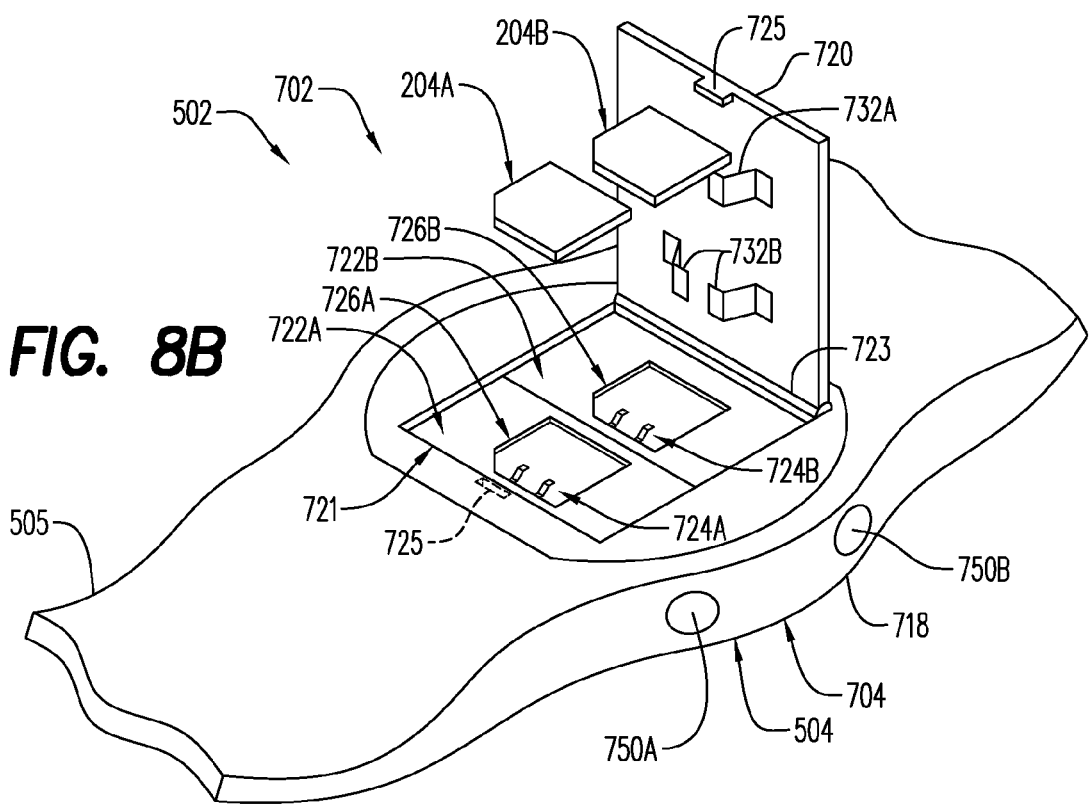

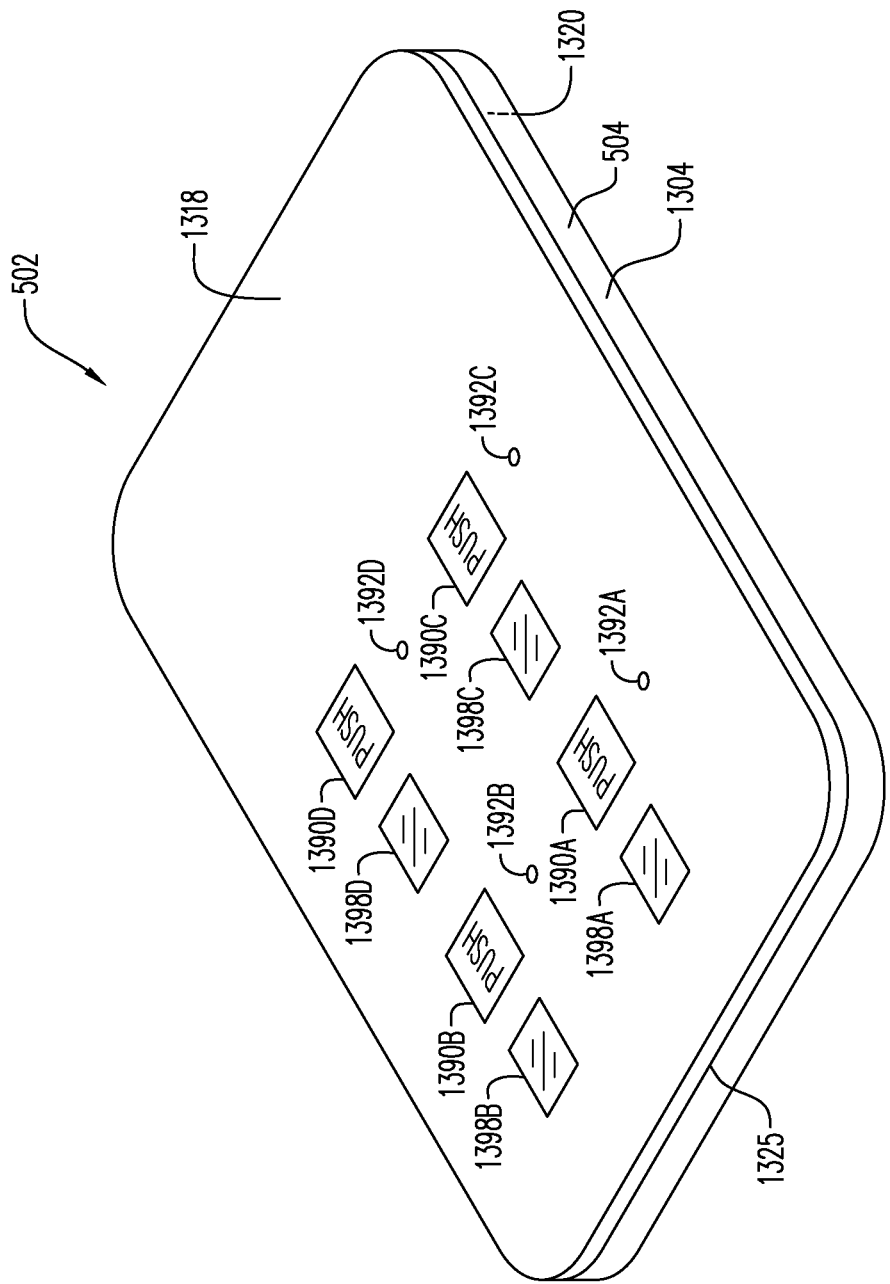

US 8,925,825 B2

IDENTIFICATION TOKEN AND METHOD OF MAKING IDENTIFICATION TOKEN

CROSS REFERENCE TO RELATED APPLICATION

The present application is a continuation of co-pending prior U.S. Ser. No. 11/852,712, filed Sep. 10, 2007, which prior application is incorporated herein by reference.

BACKGROUND

Proximity payment cards are in widespread use. A well known standard for such cards has been promulgated by MasterCard International Incorporated, the assignee hereof, and is referred to as "PayPass". Proximity payment cards typically include a radio frequency identification (RFID) integrated circuit (IC) embedded in a card-shaped plastic body. An antenna is also embedded in the card body. The antenna allows the card to receive a power signal from a point of sale terminal. The antenna is also used by the RFID IC to transmit the payment card account number, and possibly other information as well, to the POS terminal.

BRIEF DESCRIPTION OF THE DRAWINGS

FIG. 8A is a perspective view of a portion of a proximity payment device, according to some embodiments.

FIG. 8B is a perspective view of a portion of the proximity payment device of FIG. 8A, according to some embodiments, with a case in an open state and two small IC cards uninstalled.

FIG. 13A is a perspective view of a proximity payment device according to some embodiments.

DETAILED DESCRIPTION

In some embodiments, a wristwatch 702 and/or other type of proximity payment device 502 may be the same as and/or similar to one or more embodiments of a wristwatch 702 and/or other type of proximity payment device disclosed in U.S. patent application Ser. No. 11/852,739, entitled "IDENTIFICATION TOKEN AND METHOD OF MAKING IDENTIFICATION TOKEN", filed in the name of Simon Phillips on even date herewith, the contents of which are hereby incorporated by reference.

Figure 1:
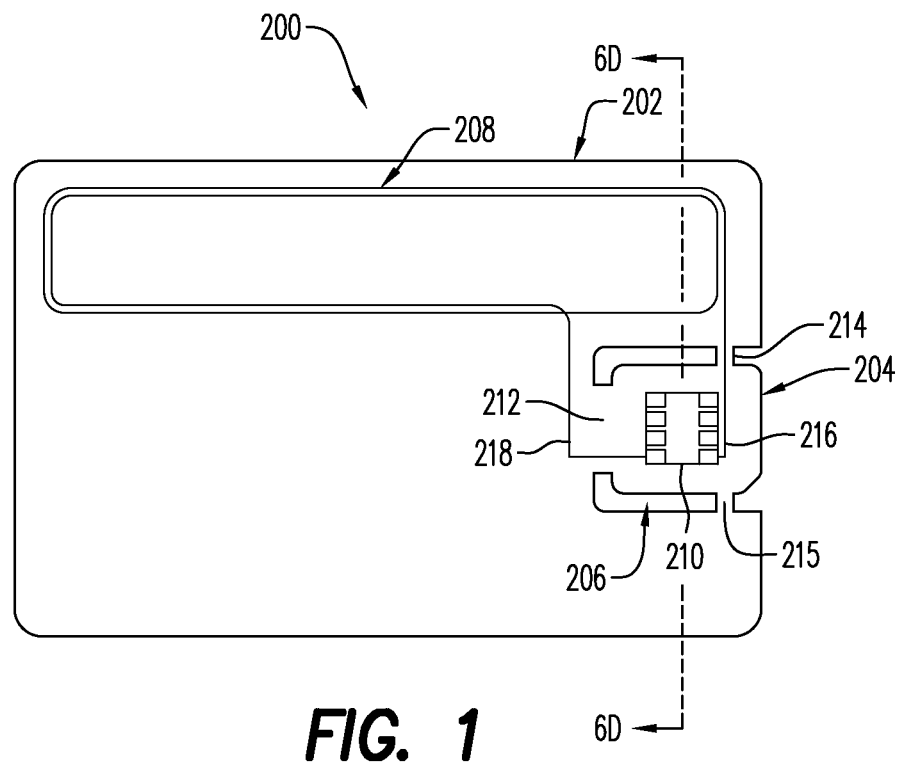
FIG. 1 is a plan view of a structure that includes a small IC card blank and a larger carrier for the small IC card blank, in accordance with some embodiments.

FIG. 1 is a plan view of a structure 200, according to some embodiments, which includes a card carrier, indicated by reference numeral 202, and a small IC card blank indicated by reference numeral 204. The carrier 202 may be generally card-shaped and may have dimensions as defined for the standard card referred to as "ID1" in ISO/IEC standard 7810, promulgated by the International Standardization Organization and other bodies. The small IC card 204 may have dimensions as defined for the standard card/module referred to as "ID0000" in the same document no. 7810. The small IC card 204 may be substantially defined within the body of the carrier 202 by substantial or nearly complete punching or scoring of the body of the carrier 202, which punching or scoring is indicated at 206. The carrier 202 includes an antenna 208 embedded therein. In some embodiments, the antenna 208 may take the form of one, two or several loops that run along one or more portions of the periphery of the carrier 202. Alternatively, the antenna 208 may be of a different type and/or configuration. The antenna may be operative generally in accordance with the above-mentioned PayPass standard to receive interrogation and power signals (which may be the same signal) from a proximity coupling device of a POS terminal and to transmit payment card account number information and/or other information to the proximity coupling device.

The small IC card 204 includes an IC indicated at 210, on which several contact pads (not separately assigned numerals in FIG. 2) are formed. The carrier 202 constitutes a "surrounding card" that surrounds and carries the small IC card blank 204.

In some embodiments, the body of the small IC card 204 may be joined to the body of the carrier 202 by, and only by, one or more bridges at the periphery of the body of the small IC card 204. Three such bridges are shown, at 212, 214 and 215, although more bridges or fewer bridges may be used. The bridges may be formed as locations around the periphery of the small IC card 204 at which the scoring or punching has not occurred.

The IC 210 of the small IC card 204 may be electrically conductively coupled to the antenna by electrically conductive connections 216, 218 which extend across one or more of the bridges. In the illustrated embodiment, electrically conductive connections 216, 218 extend across bridges 212, 214, respectively. In some embodiments, the electrically conductive connections 216, 218 may be at least partially embedded in any bridge(s) across which the electrically conductive connections extend across.

In some embodiments, the structure 200 may be made using one or more portions of one or more methods disclosed in U.S. patent application Ser. No. 11/852,739, entitled "IDENTIFICATION TOKEN AND METHOD OF MAKING IDENTIFICATION TOKEN", filed in the name of Simon Phillips on even date herewith, the contents of which are hereby incorporated by reference.

One or more surfaces of the small IC card 204 may carry one or more logos and/or brands, including for example the brand/logo of a national payment card association such as MasterCard International Incorporated. The brand/logo of the issuer may also be present, as well as, for example, a specific card product brand. Other features that may be present on the small IC card 204 (though such features are not shown) are an adhesive paper strip to receive the signature of the cardholder, and a security code or the like printed on the adhesive strip.

In accordance with some embodiments, "pre-personalization" may be performed with respect to the small IC card 204. As is familiar to those who are skilled in the art, pre-personalization entails writing into the IC 210, via radio frequency communication (received by the IC 210 via the antenna 208), certain information such as loading of keys to be used in subsequent transactions and setting of parameters (such as to select a particular card brand to be borne by the small IC card 204). In addition, information such as a payment card association brand, etc., may be printed on the small IC card 204 as part of the pre-personalization process. It will be appreciated that the information stored in the IC 210 and/or printed on the small IC card 204 may be the same as stored in the IC 210 and/or printed on the small IC card processed in a particular production run.

A "personalization" step may also be performed with respect to the small IC card 204. In the personalization step, the small IC card 204 is effectively assigned to a particular payment card account and/or a particular account holder by writing into the IC 210 (again via radio frequency communication through the antenna 208) information such as a payment card account number and the name of the account holder. Other information, such as expiration date, may be stored in either of the pre-personalization and personalization steps. Moreover, the pre-personalization and personalization steps may be combined in one operation. Such an operation (or operations, if the steps are performed separately) may be performed by use of an item of conventional contactless card programming equipment, such as the model 9000 available from Datacard Group, Minnetonka, Minn.

In accordance with some embodiments, the payment card account number and/or any other information (or a portion thereof) that was (or is to be) stored in the IC 210 may be printed on a surface of the small IC card 204. In accordance with some embodiments, the printing of the payment card account number on the small IC card 204 may be by use of the above-mentioned Datacard 9000 equipment or by another suitable device with printing capabilities.

In some embodiments, information printed on the small IC card 204 may be the same as and/or similar to information printed in one or more embodiments, disclosed in U.S. patent application Ser. No. 11/852,751, entitled "IMPROVED IDENTIFICATION OF INSTALLABLE CARD", filed in the name of Simon Phillips on even date herewith, the contents of which are hereby incorporated by reference.

In some embodiments, use of a small card having dimensions of an "ID0000" card/module, which is smaller than a "ID000" card/module, may allow the small IC card 204 to be positioned at a location away from a vacuum cup and/or other suction devices that may be employed in programming equipment, such as the model 9000 available from Datacard Group, Minnetonka, Minn., which may be used to program the small IC card 204. In some embodiments, the small card may have some other dimensions and/or configuration.

In some embodiments, the small IC card 204 may have dimensions and/or a configuration that are the same as and/or similar to the dimensions and/or the configuration of one or more embodiments of the small IC card 204 disclosed in U.S. patent application Ser. No. 11/852,739, entitled "IDENTIFICATION TOKEN AND METHOD OF MAKING IDENTIFICATION TOKEN", filed in the name of Simon Phillips on even date herewith, the contents of which are hereby incorporated by reference.

In accordance with some embodiments, the structure 200 may thereafter be used as a proximity payment device. As further described hereinafter, the small IC card 204 may also be detached from the carrier 202 and installed in one or more devices, which may become proximity payment devices.

Figure 2:
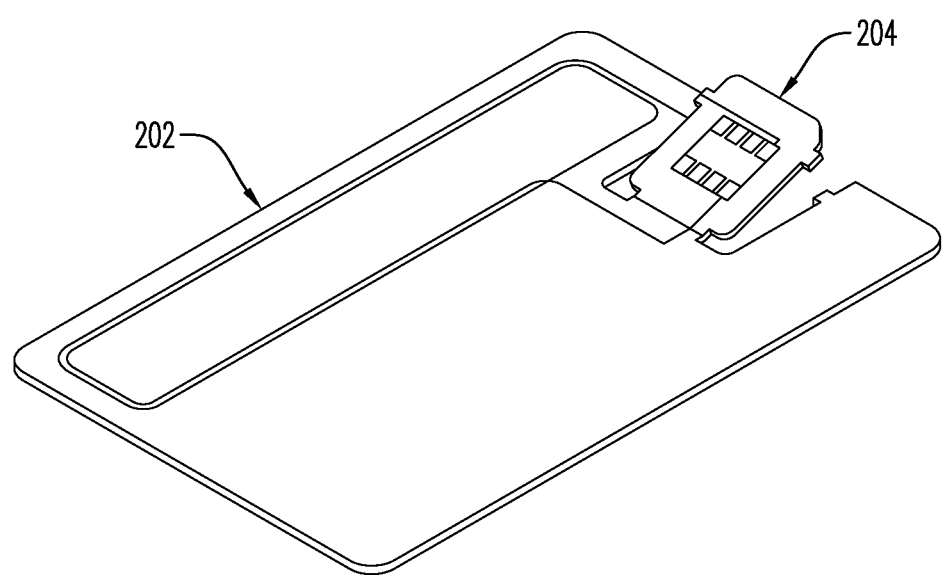
FIG. 2 is a perspective view of the structure of FIG. 1 as the small IC card is being detached from the carrier

In some embodiments, this may be done by the account holder, after the carrier 202, with the small IC card 204, is mailed to the account holder. FIG. 2 is a perspective view of the small IC card 204 and the carrier as the small IC card 204 is being detached therefrom. As seen in FIG. 2, the detaching of the small IC card 204 from the carrier 202 may be accomplished by snapping the small IC card 204 from the bridges 212, 214, 215. This breaks the bridges 212, 214, 215 and detaches the IC 210 from the antenna 208 of the carrier 202.

Figure 3:
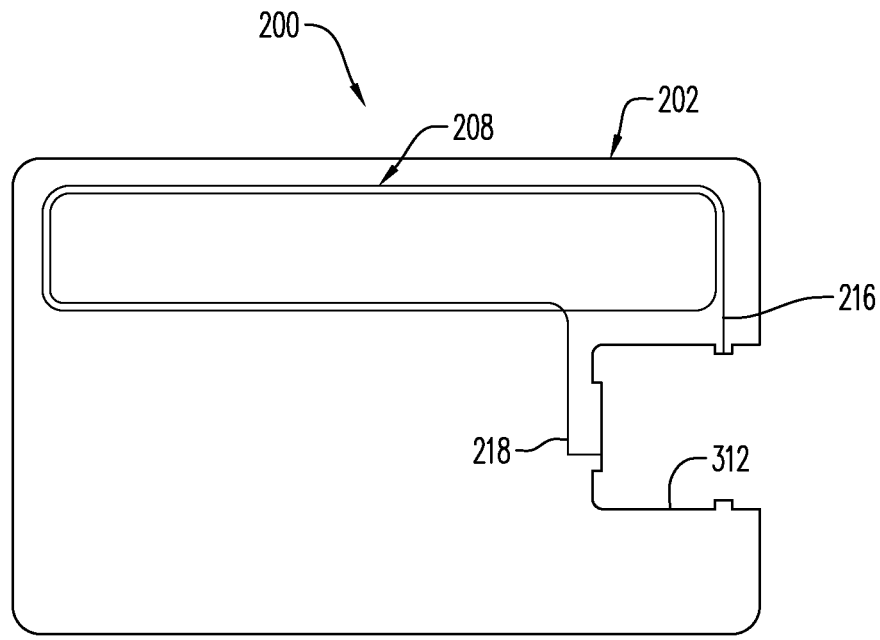
FIG. 3 is a view similar to FIG. 2 of the carrier after the small IC card has been removed therefrom.

FIG. 3 is a plan view of the carrier 202 in its condition after the small IC card 204 has been detached from the carrier 202.

Figure 4:
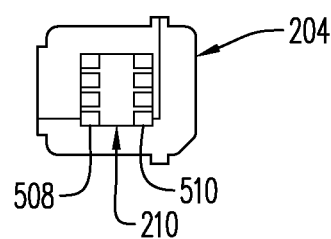
FIG. 4 is a plan view of the small IC card after it has been removed from the carrier.

FIG. 4 is a plan view of the small IC card 204 after it has been detached from the carrier 202. It will be noted from both of FIGS. 3 and 4 that the connections 216, 218 between the IC 210 and the antenna 208 have been severed by the act of detaching the small IC card 204 from the carrier 202. The detaching of the small IC card 204 leaves behind an aperture 312 in the carrier 202. It will be observed from FIG. 4 that stubs of the connections to the (temporary) antenna 208 may still be coupled to the contact pads 508, 510, respectively.

As stated above, the small IC card 204 may be detached from the carrier 202 and installed in a device, which may become a proximity payment device. The device may be, for example, a wristwatch, a wristband, a bracelet or a pendant. The device may include an antenna to which the IC 210 is coupled by the installation of the small IC card 204 in the device. In some embodiments, this may be done by spring-loaded or spring contacts in the device brought into contact with contact pads on the IC 210 by the process of installing the small IC card 204 in the device.

Figure 5:
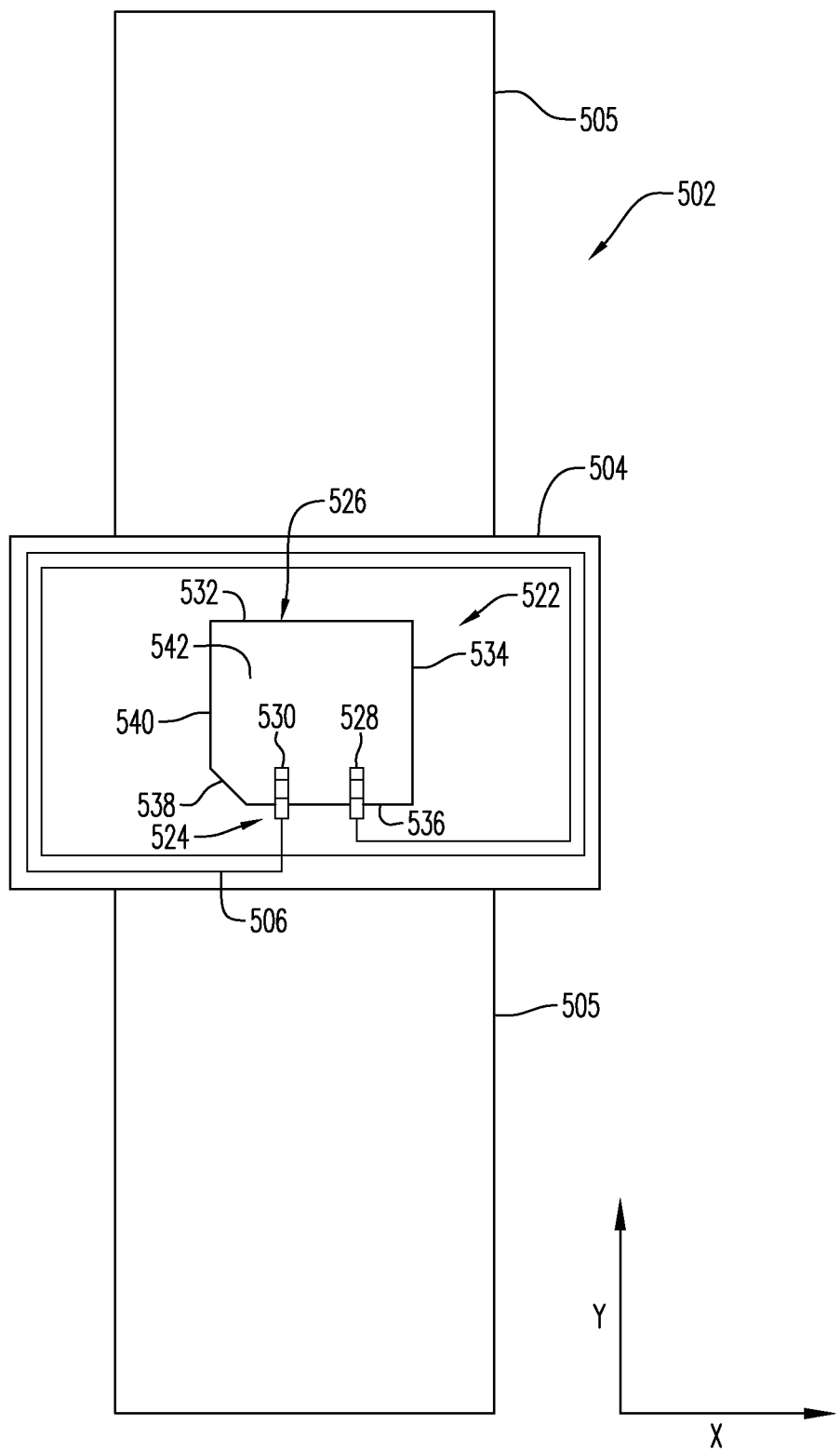
FIG. 5 is a schematic plan view of a portion of a proximity payment device, in accordance with some embodiments, prior to installing the small IC card therein.

FIG. 5 is a schematic plan view of a proximity payment device 502 in accordance with some embodiments, prior to installing the small IC card 204 therein. Referring to FIG. 5, in accordance with some embodiments, the proximity payment device 502 may include a body 504. If the proximity payment device 502 is a wristwatch, the body 504 may be the case of the wristwatch, and other functional components of the wristwatch, such as a movement, a numeric liquid crystal display, a wristwatch chip, a battery, etc., may be present but are not shown in the drawing. The proximity payment device 502 may further include a wrist band 505 or the like which may be secured to the body 504. The proximity payment device 502 need not be a wristwatch but may rather be a wristband or a bracelet, or a pendant, or any other type of device.

The body 504 supports one or more components of the proximity payment device and thus defines a support structure for the proximity payment device. Notably, a structure supports a component of the proximity payment device if the component is at least (i) partially and/or entirely contained in, mounted on, mounted in, installed on, installed in and/or embedded in the structure and/or (ii) partially and/or entirely contained in, mounted on, mounted in, installed on, installed in and/or embedded in a component that is supported by the structure. As used herein and in the appended claims, the term "embedded" includes both completely and partially embedded.

The proximity payment device 502 may also include an antenna 506 contained in and/or supported on the body 504. As further described hereinafter, the antenna 506 may be electrically conductively coupled to the IC 210 of the small IC card 204. The coupling of the IC 210 to the antenna 506 may be via the contact pads 508, 510.

As shown, the antenna 506 may be in the form of several loops arranged in and/or supported on the proximity payment device 502. Alternatively, the antenna 506 may be of a different type and/or configuration. The antenna may be operative generally in accordance with the above-mentioned PayPass standard to receive interrogation and power signals (which may be the same signal) from a proximity coupling device of a POS terminal and to transmit payment card account number information and/or other information to the proximity coupling device.

The proximity payment device 502 may further include a holder 522 and an electrical interface 524. The holder 522 may include a seat 526 adapted to receive the small IC card 204 and to support and/or position the small IC card 204 relative to the electrical interface 524, at least in part. The electrical interface 524 may include first and second contacts 528, 530, which may be adapted to contact the contacts 508, 510, respectively, of the IC 210 of the small IC card 204. The contacts 528, 530 may also be electrically connect to the antenna 506, to thereby electrically connect the antenna 506 to the contacts 508, 510 of the IC 210 of the small IC card 204.

The seat 526 may include a plurality of surfaces 532-540, which may be adapted to abut surfaces of the small IC card 204 to support and/or position the small IC card 204 in the x and y directions, at least in part. The seat 526 may further include a surface 542 adapted to support and/or position the small IC card 204 in the z direction (i.e., perpendicular to the x and y directions) at least in part.

The contacts 528, 530 may be biased (e.g., in the z direction) so as to help insure contact with respective contacts of the IC 210 of the small IC card 204. In some embodiments, each of the contacts 528, 530 may comprise a spring contact that includes a contact and a spring integral therewith to bias the spring contact (e.g., in the z direction).

In some embodiments, the holder 522 and/or the electrical interface 524 may be disposed within the body 504 of the proximity payment device 502. In such embodiments, one or more portions of the body 504 may be movable and/or removable to access the holder 522 and/or electrical interface 524 of the proximity payment device 502.

The proximity payment device 502 may operate in a conventional manner. For example, the proximity payment device may operate in accordance with the above-mentioned "PayPass" standard. The proximity payment device 502 may be presented to a proximity coupling device (not shown) of a POS terminal (not shown) to accomplish payment for a sales transaction. The proximity coupling device may transmit an interrogation signal. The proximity payment device 502 may receive the interrogation signal via the antenna 506. The received interrogation signal may cause the IC 210 to be powered-up. For example, the IC 210 may rectify the received interrogation signal to generate a DC power level. The IC 210 may transmit a signal to the proximity coupling device in response to the interrogation signal. The IC 210 may transmit the signal (and possibly one or more additional signals) to the proximity coupling device via the antenna 506. One or more signals transmitted by the IC 210 may include a payment card account number and/or other information required for interaction with the proximity coupling device. In some embodiments, the IC 210 may transmit the payment card account number and/or other information via the antenna 506 after a handshake procedure or the like with the POS terminal. The POS terminal may then interact with a payment card system to charge the current sales transaction to the payment card account represented by the payment card account number received from the proximity payment device 502.

In some embodiments, a user may remove the small IC card 204 from the proximity payment device 502. Such small IC card 204 may thereafter be (i) installed into another proximity payment device 502 and/or (ii) replaced by another small IC card 204, the latter of which may be installed in the proximity payment device 502.

The structure 200 may be fabricated in any manner.

FIGS. 6A-6D show a method for fabricating the structure 200, in accordance with some embodiments.

Figure 6A:
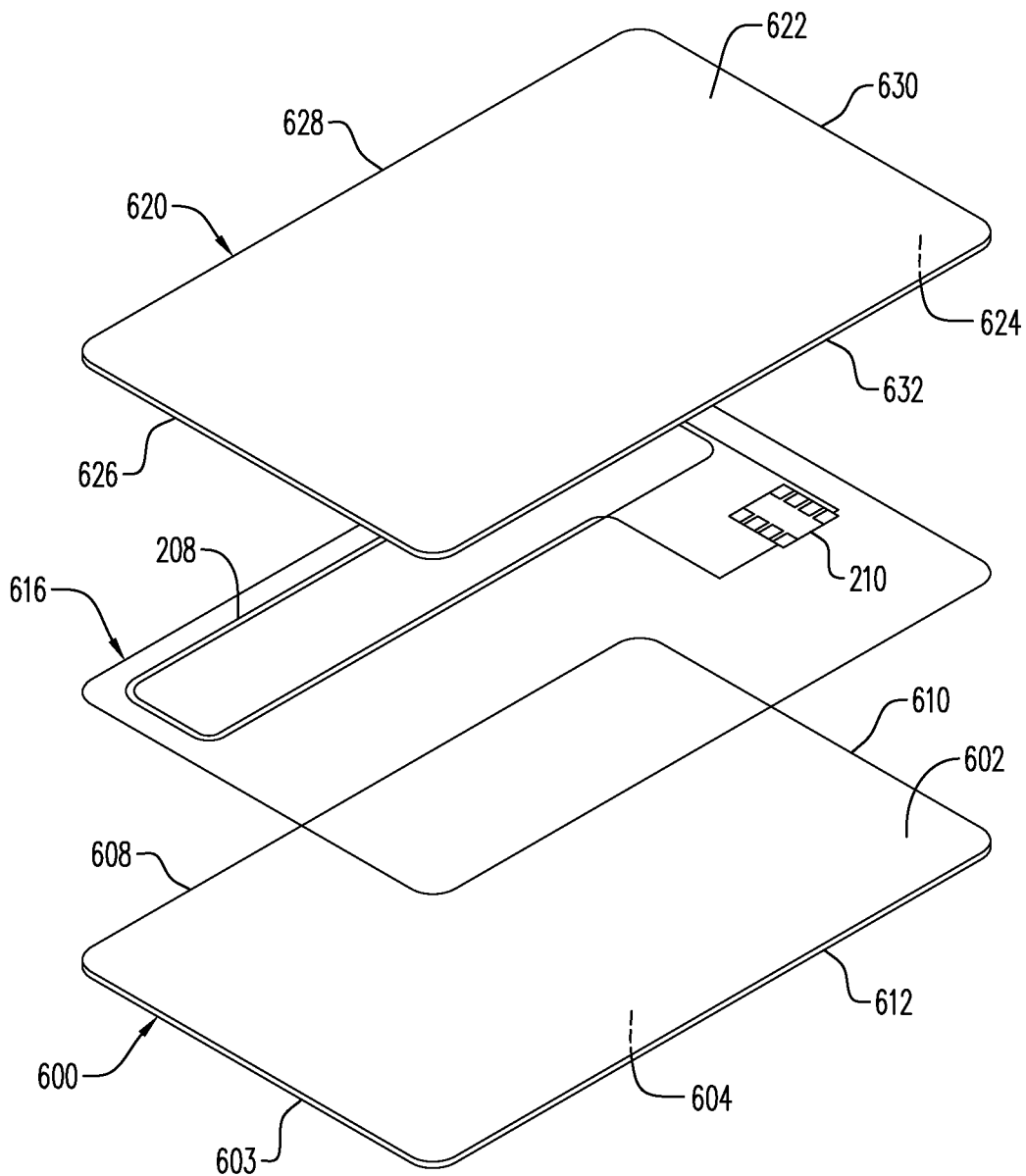
FIGS. 6A-6D show a method for fabricating the card blank and carrier of FIG. 1, in accordance with some embodiments.

Referring to FIG. 6A, a first layer 600 may be provided. The first layer 600 may be card shaped with major outer surfaces 602, 604 and edges 606, 608, 610, 612. A central portion, indicated at 616 and sometimes referred to herein as an "inlay", may be disposed on one of the major outer surfaces 602, 604 of the first layer 600. The central portion 616 may include the antenna 208 and the IC 210. A second layer 620 may be disposed on the central portion. As with the first layer 610, the second layer 620 may be card shaped with major outer surfaces 622, 624 and outer edges 616, 618, 620, 622. The outer edges 616, 618, 620, 622 of the second layer 620 may be disposed in register with the outer edges 606, 608, 610, 612 of the first layer 600.

Figure 6B:
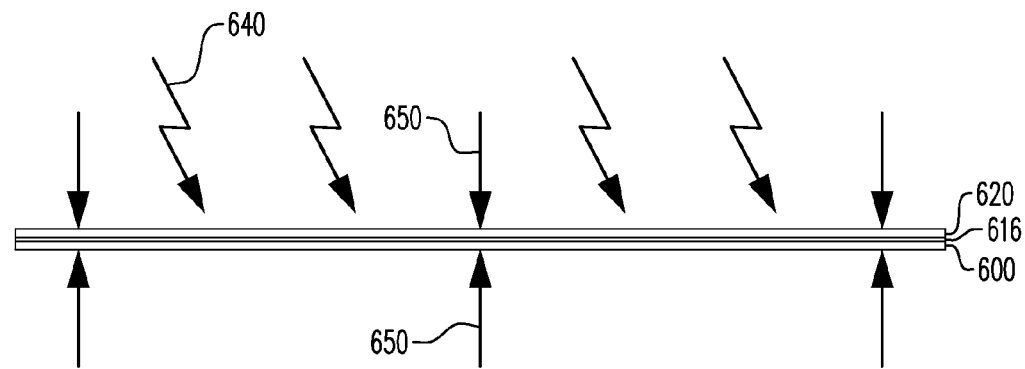

Referring to FIG. 6B, heat 640 and/or pressure 650 may be applied to the first layer 600 and/or the second layer 620. The heat 640 and/or pressure 650 may cause the first layer 600 and the second layer 620 to become bonded to one another so as to trap the antenna 208 and the IC 210 therebetween. In some embodiments, the first layer 600 and the second layer 620 are each formed of plastic or other suitable material.

Figure 6C:
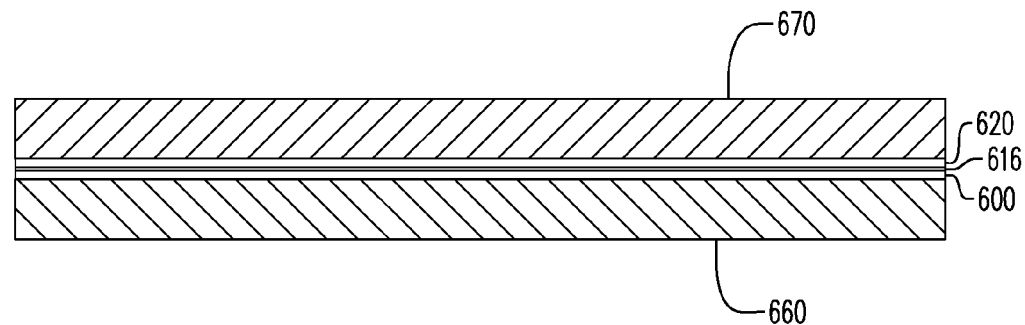

Referring to FIG. 6C, one or more platens 660, 670 may be employed to provide such heat 650 (FIG. 6C) and/or pressure 640 (FIG. 6C).

Figure 6D:
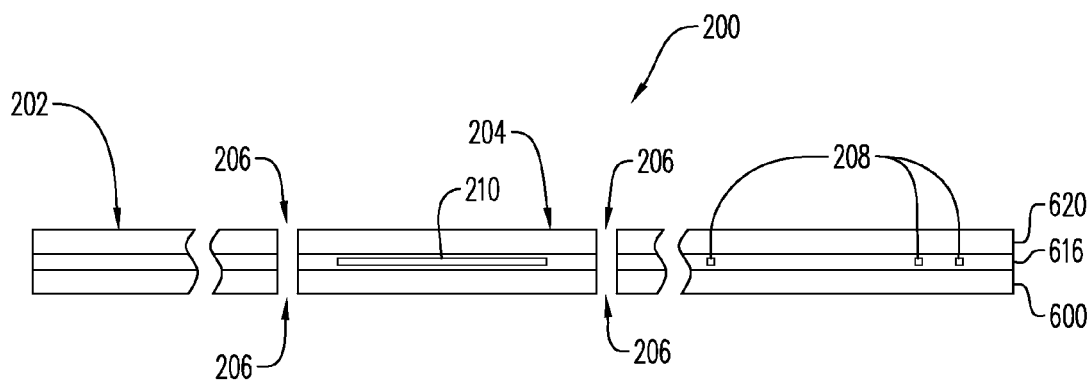

Referring to FIG. 6D, a schematic cross sectional view of one embodiment of the structure 200 taken in a direction 6D-6D of FIG. 2A, one or more portion of the first layer 600 and/or one or more portion of the second layer 620 may be removed, e.g., by punching or scoring indicated at 206 (FIG. 2A), to define the inner periphery of the carrier 202 (FIG. 2A), the outer periphery of the small IC card blank 204 (FIG. 2A) and one or more of the one or more bridges, e.g., bridges 212, 214, 215.

As stated above, in some embodiments, the proximity payment device 502 may be a wristwatch, a wristband, a bracelet, a pendant, etc.

Figure 7A:
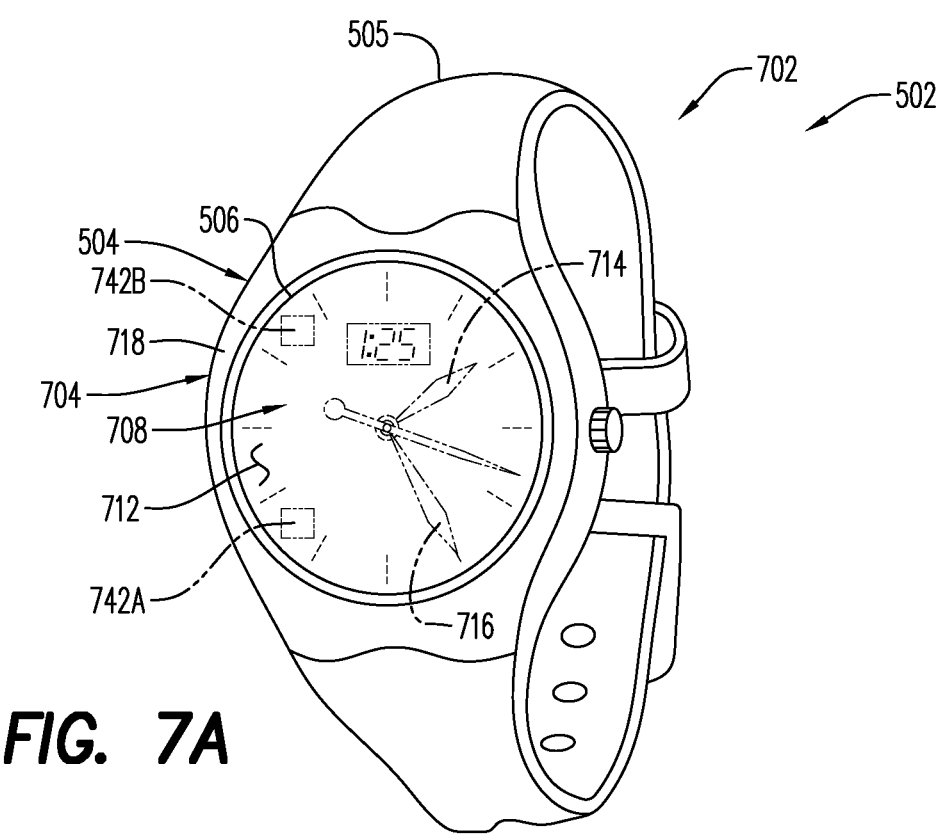
FIG. 7A is a perspective view of a proximity payment device, according to some embodiments.

FIG. 7A is a perspective view of a proximity payment device 502 that comprises a wristwatch 702, according to some embodiments.

Referring to FIG. 7A, the wristwatch 702 may include a body 504 and a wristband 505 secured to the body 504. The body may define a case 704, which may enclose the antenna 506, a display 708, a power source (e.g., a power source 734 (FIG. 7E)), and/or one or more other components (e.g., a movement (not shown), a wristwatch chip (not shown), etc.) of the wristwatch 702. The display 708 may indicate time and may comprise an analog display and/or a digital display. An analog display may include a dial (or graduated face) 712 and one or more rotating members (or hands) 714, 716. A digital display may include a numerical display (e.g., a numeric liquid crystal display or numeric LED display).

Figure 7B:
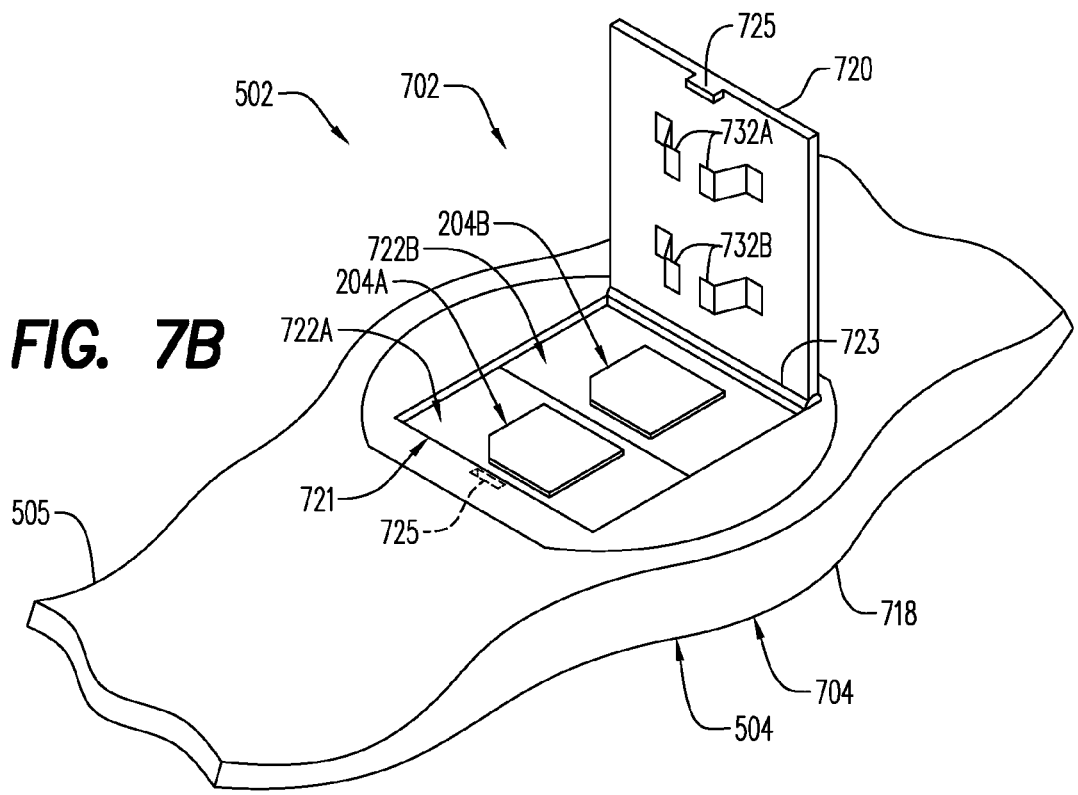
FIG. 7B is a perspective view of a portion of the proximity payment device of FIG. 7A, according to some embodiments, with a case in an open state.

FIG. 7B is a schematic, perspective view of a portion of the wristwatch 702, according to some embodiments, with the case 704 in an open state. Referring to FIG. 7B, in accordance with some embodiments, the case 704 may include one or more portions, e.g., a front portion 718 and a back portion 720. The front portion 718 may be substantially transparent to allow the display 708 to be seen therethrough. One or more portions of the case 704 may be movable relative to one or more other portions of the case 704 to allow access to an internal chamber 721 of the wristwatch 702. For example, one side of the back portion 720 may be retained by a hinge 723 and the other side of the back portion 720 may be retained by a releasable catch 725, such that upon releasing the releasable catch, one side the back portion 720 may be free to pivot away from the rest of the case 704.

The proximity payment device 702 may be adapted to receive one or more small IC cards 204. In accordance with some embodiments, the wristwatch 702 may be adapted to receive two small IC cards 204A, 204B.

Figure 7C:
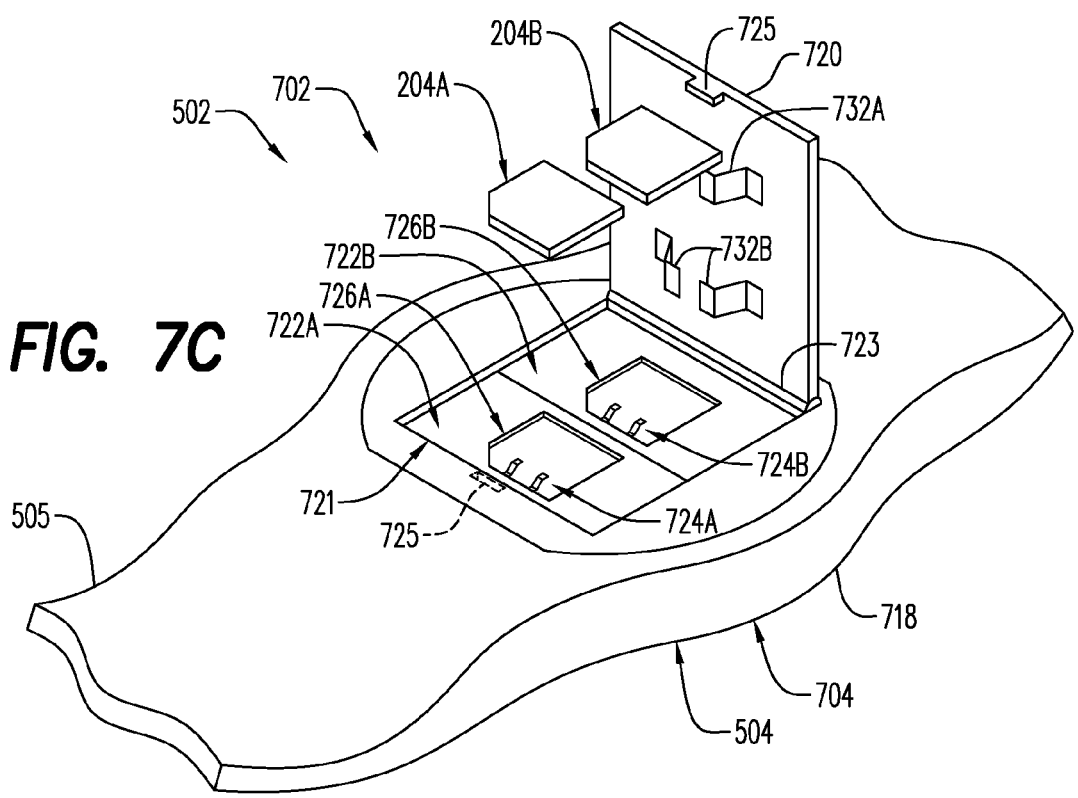
FIG. 7C is a partially exploded perspective view of the proximity payment device of FIG. 7A, according to some embodiments, with the case in an open state and the small IC card uninstalled.
Figure 7D:
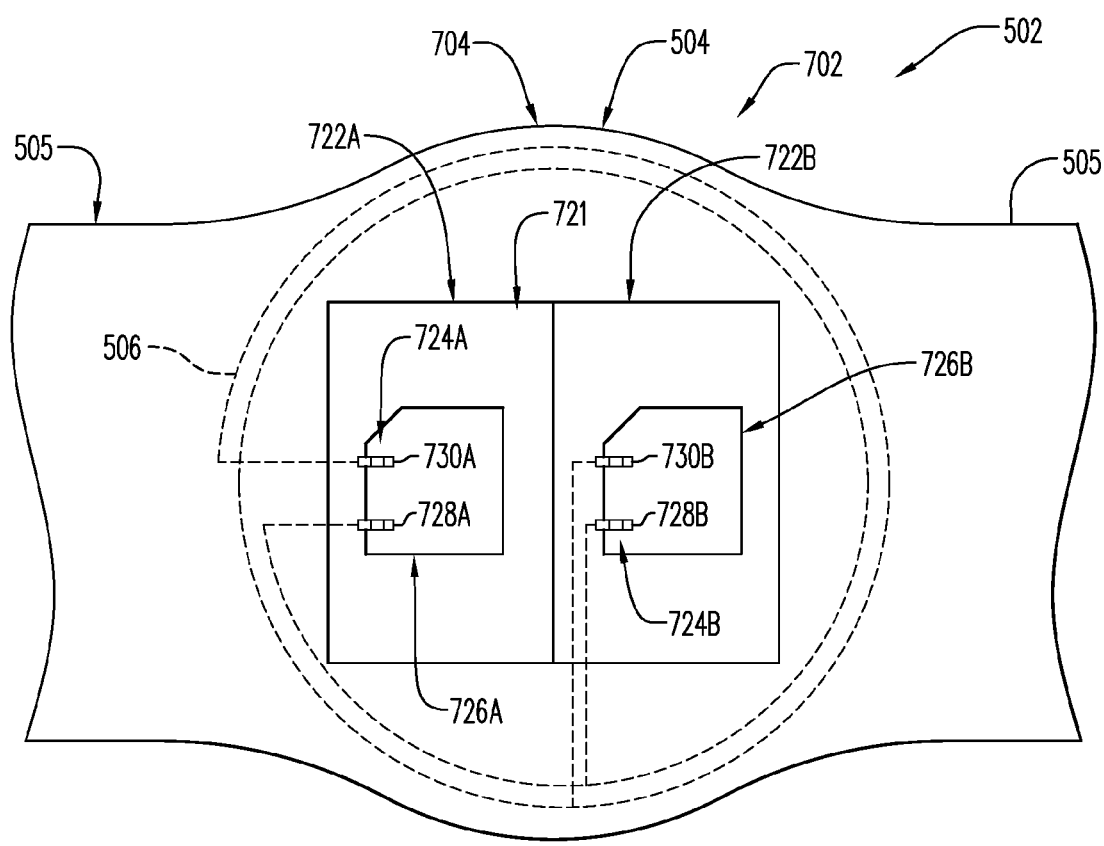
FIG. 7D is a schematic plan view of a portion of the proximity payment device of FIG. 7A, according to some embodiments, with the case removed and the small IC card uninstalled.

FIG. 7C is a schematic, partially exploded perspective view of a portion of the wristwatch 702, according to some embodiments, with the case 704 in an open state and the small IC cards 204A, 204B uninstalled. FIG. 7D is a schematic plan view of a portion of the wristwatch 702, according to some embodiments, with the case removed and the small IC cards uninstalled.

Referring to FIGS. 7C-7D, in accordance with some embodiments, the wristwatch 702 may include first and second holders 722A, 722B and first and second electrical interfaces 724A, 724B. The first holder 722A may include a seat 726A adapted to receive a small IC card 204A and to support and/or position the small IC card 204A relative to the electrical interface 724A, at least in part. The first electrical interface 724A may include first and second contacts 728A, 730A, which may be adapted to contact the contacts 508, 510, respectively, of the IC 210 of the small IC card 204A. The contacts 728A, 730A may also electrically connect to the antenna 506, to thereby electrically connect the antenna 506 to the contacts 508, 510 of the IC 210 of the small IC card 204A.

The contacts 728A, 730A may be biased (e.g., in the z direction) so as to help insure contact with respective contacts of the IC 210 of the small IC card 204A. In some embodiments, each of the contacts 728A, 730A may comprise a spring contact that includes a contact and a spring integral therewith to bias the spring contact (e.g., in the z direction). One or more springs 732 may be provided on the back portion 720 of the case 704 to bias the small IC card 204A toward the holder 722A.

In some embodiments, the holder 722A, the electrical interface 724A, the seat 726A, and contacts 728A, 730A may be the same as and/or similar to the holder 522, the electrical interface 524, the seat 526 and contacts 528, 530, respectively, of the proximity payment device 502 described hereinabove with respect to FIG. 5.

The second holder 722B may include a seat 726B adapted to receive a small IC card 204B and to support and/or position the small IC card 204B relative to the electrical interface 724B, at least in part. The second electrical interface 724B may include first and second contacts 728B, 730B, which may be adapted to contact the contacts 508, 510, respectively, of the IC 210 of the small IC card 204B. The contacts 728B, 730B may also electrically connect to the antenna 506, to thereby electrically connect the antenna 506 to the contacts 508, 510 of the IC 210 of the small IC card 204B.

The contacts 728B, 730B may be biased (e.g., in the z direction) so as to help insure contact with respective contacts of the IC 210 of the small IC card 204B. In some embodiments, each of the contacts 728B, 730B may comprise a spring contact that includes a contact and a spring integral therewith to bias the spring contact (e.g., in the z direction). One or more springs 732 may be provided on the back portion 720 of the case 704 to bias the small IC card 204B toward the holder 722B.

Each small IC card 204A, 204B may be secured in its respective holder in any suitable manner, for example, but not limited to, mechanically (e.g., press fit, physical stops, springs). The length, width and/or depth provided for one small IC card may be the same as or different from the length, width and/or depth provided for one or more other small IC cards.

In some embodiments, the holder 722B, the electrical interface 724B, the seat 726B, and contacts 728B, 730B may be the same as and/or similar to the holder 522, the electrical interface 524, the seat 526 and contacts 528, 530, respectively, of the proximity payment device 502 described hereinabove with respect to FIG. 5.

Each portion of proximity payment device 502 may comprise any type of material(s) and may have any configuration and/or construction. Thus, for example, the case 704 may comprise any type of material(s) and may have any configuration and/or construction. In some embodiments, the case may comprise a metal, ceramic, glass, plastic, fiber, silicon, semiconductor, and/or a combination thereof. Likewise, a holder 522 and/or seat 526 may have any configuration (e.g., shape and/or size) including for example, rectangular, cylindrical, elliptical, conical, irregular and/or any combination thereof. In some embodiments, the configuration may be based on the configuration of the small IC card to be received and/or any other consideration(s) or combination thereof.

As stated above, in some embodiments, the proximity payment device 502 may further include a power source, e.g., a battery. The IC 210 of one or more of the small IC cards 204A, 204B may be adapted to be connected to such power source.

Figure 7E:
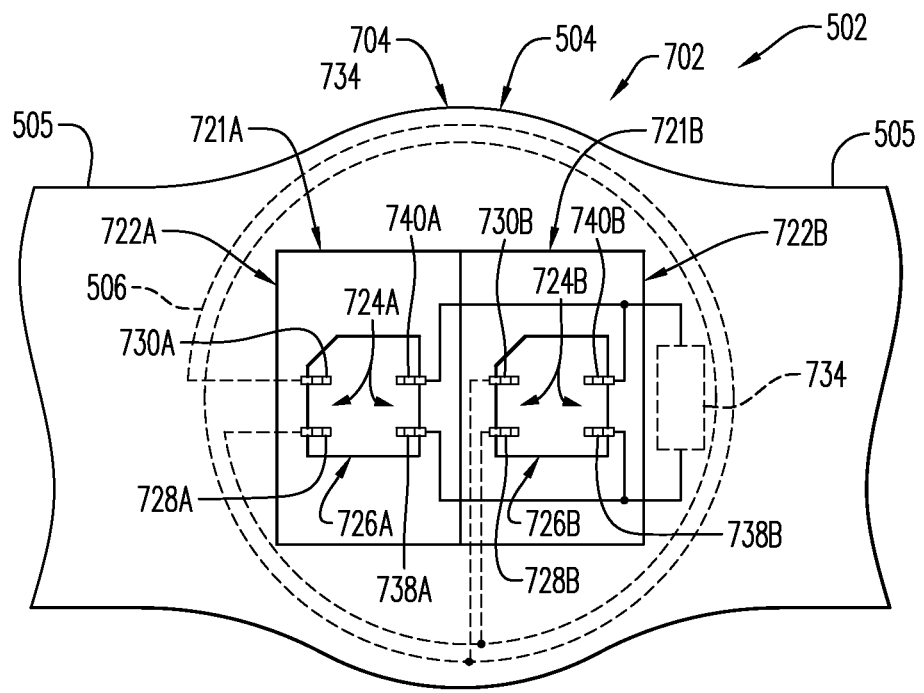
FIG. 7E is a schematic plan view of a portion of the proximity payment device of FIG. 7A, according to some embodiments, with the case removed and the small IC card uninstalled.

FIG. 7E is a schematic plan view of a portion of a wristwatch 702 in accordance with some embodiments. Referring to FIG. 7E, in accordance with some embodiments, the wristwatch 702 may comprise a power source, e.g., a battery, 734. In some embodiments, the IC 210 of one or more of the small IC cards 204A, 204B may include contacts adapted to be connected to and/or receive electrical power from the power source 734.

To that effect, the electrical interface 724A may further include third and fourth contacts 738A, 740A, which may be adapted to contact the contacts of the IC 210 of the small IC card 204A that are adapted to be connected to and/or receive electrical power from the power source 734. The contacts 738A, 740A may also electrically connect to the power source 734, to thereby electrically connect the power source 734 to the contacts of the IC 210 of the small IC card 204 that are adapted to be connected to and/or receive electrical power from the power source 734. The contacts 738A, 740A may be biased (e.g., in the z direction) so as to help insure contact with respective contacts of the IC 210 of the small IC card 204A. In some embodiments, each of the contacts 738A, 740A may comprise a spring contact that includes a contact and a spring integral therewith to bias the spring contact (e.g., in the z direction).

The electrical interface 724B may further include third and fourth contacts 738B, 740B, which may be adapted to contact the contacts of the IC 210 of the small IC card 204B that are adapted to be connected to and/or receive electrical power from the power source 734. The contacts 738B, 740B may also electrically connect to the power source 734, to thereby electrically connect the power source 734 to the contacts of the IC 210 of the small IC card 204 that are adapted to be connected to and/or receive electrical power from the power source 734. The contacts 738B, 740B may be biased (e.g., in the z direction) so as to help insure contact with respective contacts of the IC 210 of the small IC card 204B. In some embodiments, each of the contacts 738B, 740B may comprise a spring contact that includes a contact and a spring integral therewith to bias the spring contact (e.g., in the z direction).

Access to a source of electrical power may improve one or more operating characteristics of the device. In some embodiments, access to a source of electrical power may give the proximity payment device a greater range. If the proximity device has a greater range, it may not need to be positioned as close to the proximity coupling device. In some embodiments, access to a source of electrical power may allow the device to perform a greater number of functions and/or may increase the operating speed of the device.

In some embodiments, the wristwatch 702 and/or other type of proximity payment device 502 may further include a controller. The IC 210 of one or more of the small IC cards 204A, 204B may be adapted to be connected to the controller.

Figure 7F:
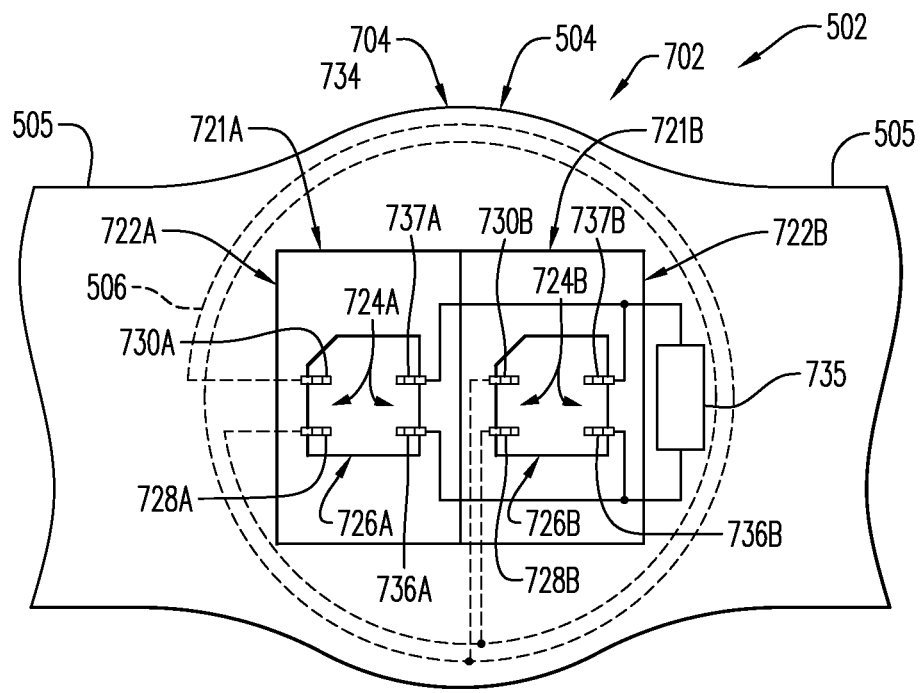
FIG. 7F is a schematic plan view of a portion of the proximity payment device of FIG. 7A, according to some embodiments, with the case removed and the small IC card uninstalled.

FIG. 7F is a schematic plan view of a portion of a wristwatch 702 that further comprises a controller 735, in accordance with some embodiments. In some embodiments, the IC 210 of one or more of the small IC cards 204A, 204B may include contacts adapted to be connected to the controller 735.

To that effect, the electrical interface 724A may include fifth and sixth contacts 736A, 737A, which may be adapted to contact the contacts of the IC 210 of the small IC card 204A that are adapted to be connected to the controller 735. The contacts 736A, 737A may also electrically connect to the at least one circuit 735, to thereby electrically connect the controller 735 to the contacts of the IC 210 of the small IC card 204A that are adapted to be connected thereto. The contacts 736A, 737A may be biased (e.g., in the z direction) so as to help insure contact with respective contacts of the IC 210 of the small IC card 204A. In some embodiments, each of the contacts 736A, 737A may comprise a spring contact that includes a contact and a spring integral therewith to bias the spring contact (e.g., in the z direction). In some embodiments, the controller 735 may comprise one or more control circuits.

The electrical interface 724B may include fifth and sixth contacts 736B, 737B, which may be adapted to contact the contacts of the IC 210 of the small IC card 204B that are adapted to be connected to the controller 735. The contacts 736B, 737B may also electrically connect to the at least one circuit 735, to thereby electrically connect the controller 735 to the contacts of the IC 210 of the small IC card 204B that are adapted to be connected thereto. The contacts 736B, 737B may be biased (e.g., in the z direction) so as to help insure contact with respective contacts of the IC 210 of the small IC card 204B. In some embodiments, each of the contacts 736B, 737B may comprise a spring contact that includes a contact and a spring integral therewith to bias the spring contact (e.g., in the z direction).

In some embodiments, each of small IC cards 204A, 204B may be enabled at all times so as to be capable of being operated at times. Indeed, in some embodiments, each of small IC cards 204A, 204B may be operated concurrently. In some other embodiments, each small IC card may be enabled only at selected times. In some embodiments, a wristwatch 702 or other type of proximity payment device 502 may include one or more input devices to enable selective operation of one or more of the small IC cards 204A, 204B.

FIG. 8A is a schematic, perspective view of a portion of a wristwatch 702 adapted to receive more than one small IC card, according to some embodiments, with the case 704 in an open state.

FIG. 8B is a schematic, partially exploded perspective view of a portion of the wristwatch 702 according to some embodiments, with the case 704 in an open state and the small IC cards 204A, 204B uninstalled.

Figure 8C:
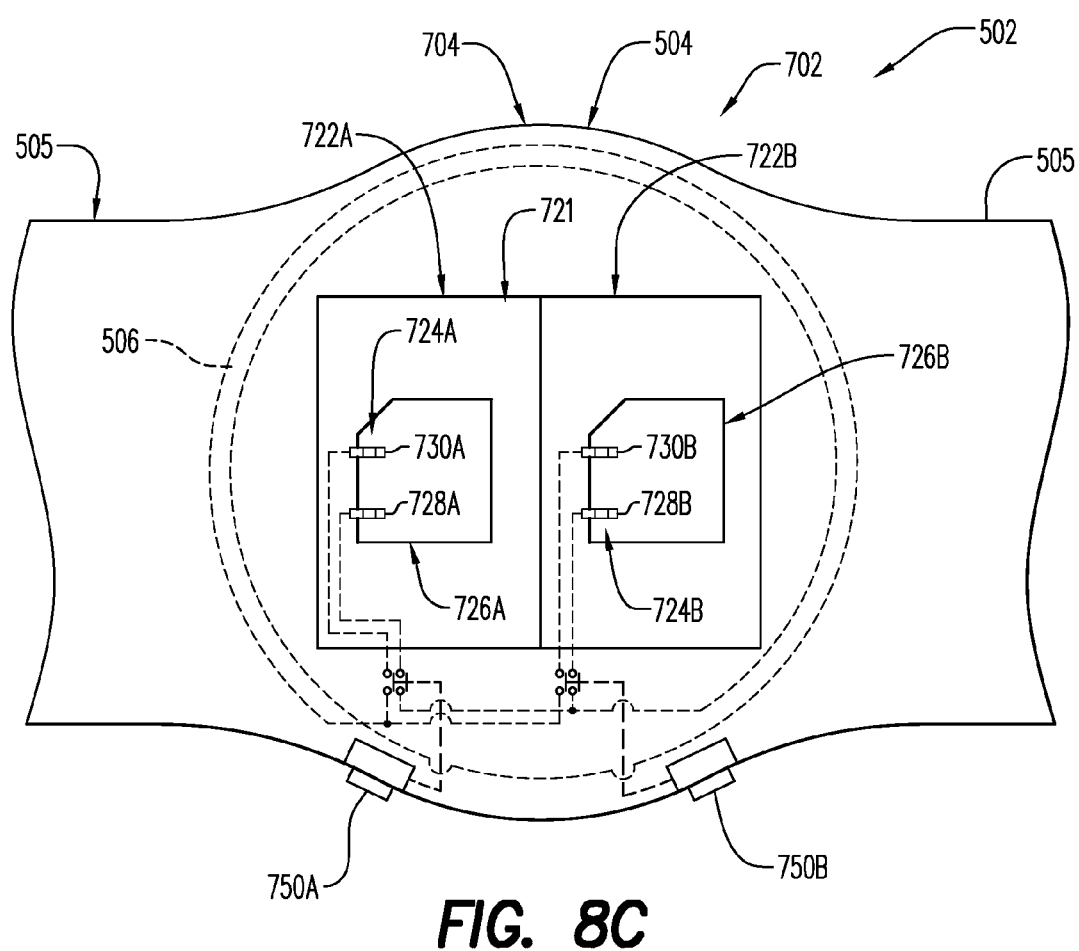
FIG. 8C is a schematic plan view of a portion of the proximity payment device of FIG. 8A, according to some embodiments, with the case removed and the two small IC cards uninstalled.

FIG. 8C is a schematic plan view of a portion of the wristwatch 702, according to some embodiments, with the case 704 removed and the small IC cards 204A, 204B uninstalled.

Referring to FIGS. 8A-8C, in some embodiments, the wristwatch 702 or other type of proximity payment device 502 may include first and second input devices 750A, 750B to enable selective operation of one or more of the small IC cards 204A, 204B.

The input devices 750A, 750B may or may not be identical to one another. In some embodiments, the input devices 750A, 750B may each comprise a push-button switch or other type of tactile input device. Other types of input devices may also be used. The first and second input devices 750A, 750B may be disposed on the case 704 or at any other suitable location(s)

In some embodiments, the first input device 750A may include a switch connected in series between the contacts 728A, 730A and the antenna 506. By actuating the first input device 750A, the contacts 728A, 730A may be electrically connected to the antenna 506 (via the switch of the first input device 750A) to thereby electrically connect the antenna 506 to the contacts 508, 510 of the IC 210 of the small IC card 204A and enable operation of the small IC card 204A. Thus, the input device 750A may enable selective operation of the small IC card 204A.

The second input device 750B may include a switch connected in series between contacts 728B, 730B and the antenna 506. By actuating the second input device 750B, the contacts 728B, 730B may be electrically connected to the antenna 506 (via the switch of the second input device 750B) to thereby electrically connect the antenna 506 to the contacts 508, 510 of the IC 210 of the small IC card 204B and enable operation of the small IC card 204B. Thus, the input device 750B may enable selective operation of the small IC card 204B.

In some embodiments, the input devices 750A, 750B may be electrically connected to the controller 735 but may not be electrically connected between the electrical interfaces 724A, 724B and the antenna 506. In some embodiments, a switch electrically connected between the contacts 728A, 730A, 728B, 730B and the antenna 506 may be controlled by the controller 735.

Figure 8D:
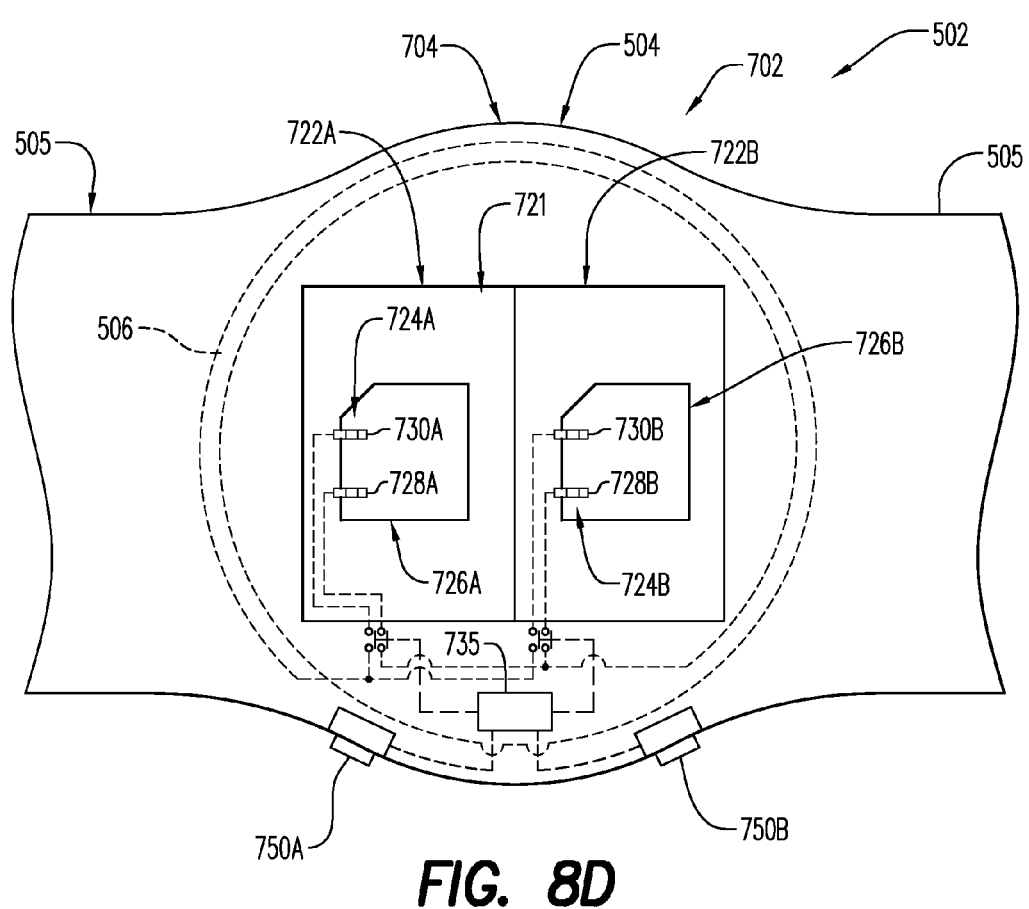
FIG. 8D is a perspective view of a portion of a proximity payment device, according to some embodiments.

FIG. 8D is a schematic plan view of a portion of the wristwatch 702, according to some embodiments, with the case 704 removed and the small IC card 204 uninstalled. Referring to FIG. 8D, in some embodiments, the wristwatch 702 or other type of proximity payment device 502 may include controller 735, which may control one or more of the switches electrically between the contacts 728A, 730A, 728B, 730B and the antenna 506. In some embodiments, the controller 735 may comprise a control circuit.

The first input device 750A and the second input device 750B may each be connected to the controller 735. Actuating the first input device 750A may cause a signal to be supplied to the controller 735, which may in turn supply a control signal that causes one of the switches to close such that the contacts 728A, 730A may be electrically connected to the antenna 506 (via the switch controlled by the controller) to thereby electrically connect the antenna 506 to the contacts 508, 510 of the IC 210 of the small IC card 204A and enable operation of the small IC card 204A. Thus, the input device 750A may enable selective operation of the small IC card 204A. In some embodiments, the controller 735 may supply a control signal that causes the switch to open. In some embodiments, the controller 735 may supply such control signal after a predetermined delay.

Actuating the second input device 750B may cause a signal to be supplied to the controller 735, which may in turn supply a control signal that causes one of the switches to close one of the switches such that the contacts 728B, 730B may be electrically connected to the antenna 506 to thereby electrically connect the antenna 506 to the contacts 508, 510 of the IC 210 of the small IC card 204B and enable operation of the small IC card 204B. Thus, the input device 750B may enable selective operation of the small IC card 204B. In some embodiments, the controller 735 may supply a control signal that causes the switch to open. In some embodiments, the controller 735 may supply such control signal after a predetermined delay.

In some embodiments, the controller 735 may be disposed within the wristwatch 702 or other proximity payment device 502, and if the wristwatch 702 or other proximity payment device 502 includes a battery, may be powered at least in part by such battery.

The controller may or may not control any other components of the proximity payment device.

As used herein, a controller may be any type of controller. For example, a controller may be programmable or non programmable, general purpose or special purpose, dedicated or non dedicated, distributed or non distributed, shared or not shared, and/or any combination thereof. If the controller has two or more distributed portions, the two or more portions may communicate with one another through a communication link. A controller may include, for example, but is not limited to, hardware, software, firmware, hardwired circuits and/or any combination thereof.

A communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols.

In some embodiments, the controller 735 may (i) receive information from one or more of the small IC cards 204A, 204B and/or (ii) supply information in regard to one or more of the small IC cards 204A, 204B. In some embodiments, one or more portions of the information supplied by the controller 735 may be supplied to the display. In some embodiments, the information supplied by the controller 735 includes one or more signals that identifies one or more of the small IC cards 204A, 204B, indicates whether one or more of the small IC cards 204A, 204B is enabled and/or how to enable one or more of the small IC cards 204A, 204B. In some embodiments, such information is based at least in part on information received from one or more of the small IC cards 204A, 204B.

The display 708 may display information based at least in part on the information supplied thereto. Thus in some embodiments, the display may display information that identifies one or more of the small IC cards 204A, 204B, indicates whether one or more of the small IC cards 204A, 204B is enabled and/or how to enable one or more of the small IC cards 204A, 204B.

In some embodiments, the display 708 may define one or more indicators 742A-742B. In some embodiments, one such indicator, e.g., indicator 742A, displays information regarding one small IC card, e.g., small IC card 204A, and the other such indicator, e.g., indicator 742B, displays information regarding the other small IC card, e.g., small IC card 204B. In some embodiments, each indicator may provide a visual indication that may identify one or more of the small IC cards 204A-204B, indicate how to enable one or more of the small IC cards 204A-204B and/or whether one or more of the small IC cards 204A-204B is enabled. In some embodiments, a visual indication may comprise a blinking indication. In some embodiments, indicators 742A, 742B may be defined by a discrete light bulb and/or a discrete light emitting diode (LED) rather than by display device 708.

In some embodiments, the information supplied to and/or by the display may define one or more logos and/or brands. In some embodiment, the one or more logos and/or brands may include (i) a brand and/or logo of a national payment card association such as MasterCard International Incorporated, (ii) a brand and/or logo of an issuer and/or merchant associated with one or more of the small IC cards 204A-204B and/or (iii) a brand and/or logo of a specific card product. In some embodiments, a brand and/or logo may comprise a mark that is registered in one or more country or jurisdiction and/or protected under trademark law in one or more country or jurisdiction.

In some embodiments, one or more portions of the information supplied to and/or by the display may comprise one or more bit map. In some embodiments, a bit map identifies one or more of the small IC cards 204A-204B. In some embodiments, a bit map defines one or more logos and/or brands. In some embodiments, a bit map supplied by the controller is based at least in part on a bit map received from one or more of the small IC cards 204A-204B.

In some embodiments, indicators 742A-742B may comprise audio indicators and/or vibratory indicators in addition to and/or in lieu of indicators that provide visible indication. An audio indicator may provide an audible indication and/or a beeping audible indication. A vibratory indicator may provide a vibratory indication. In some embodiments, the indication may identify one or more of the small IC cards 204A-204B, indicate how to enable one or more of the small IC cards 204A-204B and/or whether one or more of the small IC cards 204A-204B is enabled.

In some embodiments, one or more of the small IC cards 204A-204D may be enabled and/or disabled in accordance with one or more methods disclosed in U.S. patent application Ser. No. 11/852,763, entitled "ENABLING IDENTIFICATION TOKEN FOR A TIMED PERIOD", filed in the name of Simon Phillips on even date herewith, the contents of which are hereby incorporated by reference.

In some embodiments, one or more of the devices and/or switches may be the same as and/or similar to one or more device and or switch disclosed in U.S. patent application Ser. No. 11/852,763, entitled "ENABLING IDENTIFICATION TOKEN FOR A TIMED PERIOD", filed in the name of Simon Phillips on even date herewith, the contents of which are hereby incorporated by reference.

In some embodiments, the controller may include one or more circuit that is the same as and/or similar to one or more circuit disclosed in U.S. patent application Ser. No. 11/852,763, entitled "ENABLING IDENTIFICATION TOKEN FOR A TIMED PERIOD", filed in the name of Simon Phillips on even date herewith, the contents of which are hereby incorporated by reference.

Some embodiments may use one or more of the techniques disclosed in U.S. patent application Ser. No. 11/852,804, entitled "METHOD FOR USE IN ASSOCIATION WITH IDENTIFICATION TOKEN AND APPARATUS INCLUDING IDENTIFICATION TOKEN", filed in the name of Simon Phillips et al. on even date herewith, the contents of which are hereby incorporated by reference.

In some embodiments, a switch may be connected in series between the contacts 508, 510 of the small IC card 204A and the contacts of the first electrical interface 724A instead of between the contacts 728A, 730A of the first electrical interface 724A and the antenna 506. In some embodiments, the switch may be actuated by the first input device 750A. For example, the switch may be part of the first input device 750A. The contacts 728A, 730A of the first electrical interface 724A may be electrically connect to the antenna 506. By actuating the first input device 750A, the contacts 728A, 730A may be electrically connected to the contacts 508, 510 of the IC 210 of the small IC card 204A (via the switch), to thereby electrically connect the antenna 506 to the contacts 508, 510 of the IC 210 of the small IC card 204A and enable operation of the small IC card 204A.

Similarly, a switch may be connected in series between the contacts 508, 510 of the small IC card 204B and the contacts of the second electrical interface 724B instead of between the contacts 728B, 730B of the second electrical interface 724B and the antenna 506. In some embodiments, the switch may be actuated by the second input device 750B. For example, the switch may be part of the second input device 750B. The contacts 728B, 730B of the second electrical interface 724B may be electrically connect to the antenna 506. By actuating the second input device 750B, the contacts 728B, 730B may be electrically connected to the contacts 508, 510 of the IC 210 of the small IC card 204B (via the switch), to thereby electrically connect the antenna 506 to the contacts 508, 510 of the IC 210 of the small IC card 204B and enable operation of the small IC card 204B.

In some embodiments, one or more of the switches that may be connected in series between the contacts 508, 510 of the small IC card and the associated electrical interface 724 may be controlled by a controller, e.g., controller 735, instead of input devices 750A, 750B. In such embodiments, the first input device 750A and/or the second input device 750B may be connected to the controller, e.g., controller 735. Actuating the first input device 750A may cause the controller to close one of the switches such that the contacts 728A, 730A may be electrically connected to the contacts 508, 510 of the IC 210 of the small IC card 204A (via the switch controlled by the controller), to thereby electrically connect the antenna 506 to the contacts 508, 510 of the IC 210 of the small IC card 204A and enable operation of the small IC card 204A. Actuating the second input device 750B may cause the controller to close another one of the switches such that the contacts 728B, 730B may be electrically connected to the contacts 508, 510 of the IC 210 of the small IC card 204B (via the switch controlled by the controller), to thereby electrically connect the antenna 506 to the contacts 508, 510 of the IC 210 of the small IC card 204B and enable operation of the small IC card 204B. In some embodiments, the controller may be disposed within the device 502, and if the device 502 includes a battery, may be powered at least in part by such battery.

In some embodiments, one more springs 764A, 764B may bias the one or more small IC cards 204A, 204B away from the respective electrical interface 724A, 724B, such that the one or more small IC cards 204A, 204B do not contact the respective electrical interface 724A, 724B unless the one or more small IC cards 204A, 204B are depressed, directly and/or indirectly.

Figure 8E:
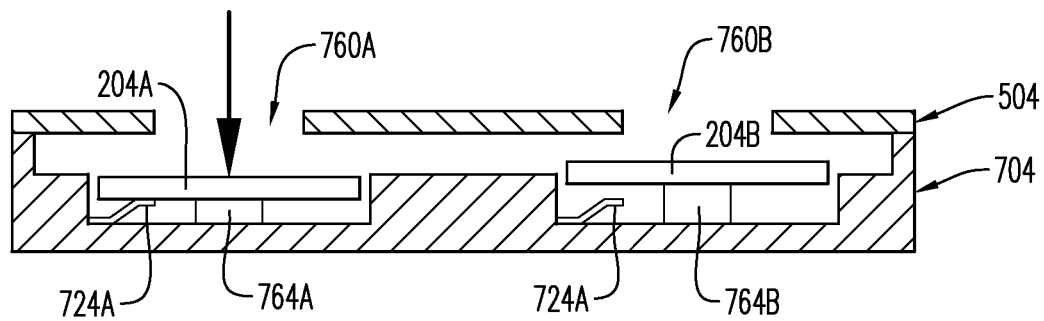
FIG. 8E is a schematic cross sectional view of a portion of a proximity payment device, according to some embodiments.
Figure 8F:
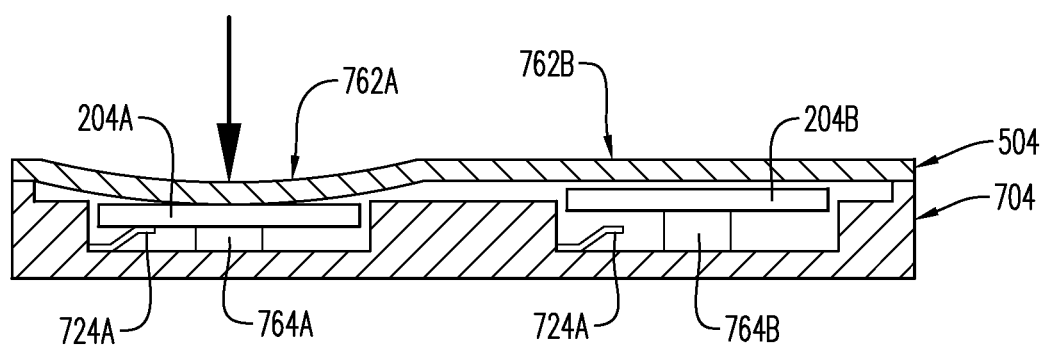
FIG. 8F is a schematic cross sectional view of a portion of a proximity payment device, according to some embodiments.

Referring to FIGS. 8E-8F, in some embodiments, the case 704 may define one or more openings 760A, 760B and/or movable portions 762A, 762B, which may be disposed in register with one or more of the small IC cards 204A, 204B, to allow one or more of the small IC cards 204A, 204B to be depressed, directly and/or indirectly.

In some embodiments, printed information includes an indication of a location of a switch or other type of input device. Thus the indication may indicate to the cardholder (the user) where the user should press with his/her finger to actuate a switch. In some embodiments, the indication may be provided on the body of the proximity payment device. If the body defines a case the indication may be provided on such case. If the proximity payment device includes a display, the indication may be provided on the display. In some embodiments, the indication may be provided on the small IC card 204. In some embodiments, one or more of the cards may include information thereon and a back portion of the case and/or another portion of the case may be transparent and/or open to allow the information to be read.

In some embodiments, one or more of the small IC cards may include an antenna.

The proximity payment device may have any number of holders and electrical interfaces to receive any number of small IC cards. Thus, in some embodiments, the proximity payment device 502 may have more than two holders and more than two electrical interfaces to receive more than two small IC cards.

If the proximity payment device has more than one holder, such holders may be fabricated separate from one another, integral with one another and/or any combination thereof. Each of the holders may be coupled to one, some or all of the other holders, as shown, or completely isolated from the other holders.

If the proximity payment device has more than one seat, such seats may be spaced apart from one another in one or more directions. In some embodiments, seats may be disposed in a linear array and spaced apart from one another in the x direction (and/or y direction). In some other embodiments, the seats may be disposed in a two dimensional array having a plurality of rows and/or columns. Thus, one or more of the seats may be spaced apart from one or more other seats in the x direction and/or y direction. In some embodiments, the seats may be disposed in a stack so as to be spaced apart from one another in the z direction. In some embodiments, the stack may define a linear array in the z direction.

As stated above, in some embodiments, the proximity payment device 502 may be a wristband, a bracelet, a pendant, etc.

Figure 9:
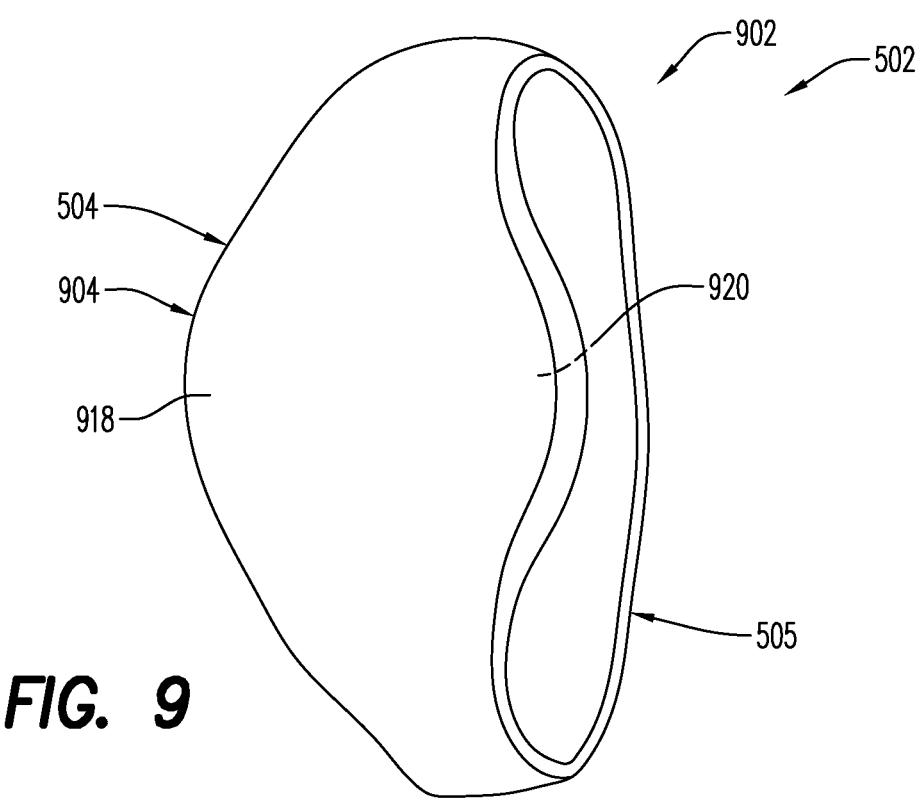
FIG. 9 is a perspective view of a proximity payment device, according to some embodiments.

FIG. 9 is a perspective view of a proximity payment device 502 that comprises a wristband 902, according to some embodiments. Referring to FIG. 9, the wristband 902 may include a housing 504, which may define a case 904 of the wristband 902. The wristband 902 may further include a band 505 and/or one or more other components (not shown). The band 505 may be secured to the case 904. The case 904 may include one or more portions, e.g., a front portion 918 and a back portion 920. One or more portions of the case 904 may be movable relative to one or more other portions of the case 904 to allow access to an internal chamber of the wristband 902

In some embodiments, the wristband 902 may further comprise additional components that are the same as and/or similar to components of one or more embodiments of the proximity payment device 502 described herein, such that the wristband 902 may operate in a manner that is the same as and/or similar to the manner of operation of one or more embodiments of the proximity payment device 502 described herein.

Figure 10:
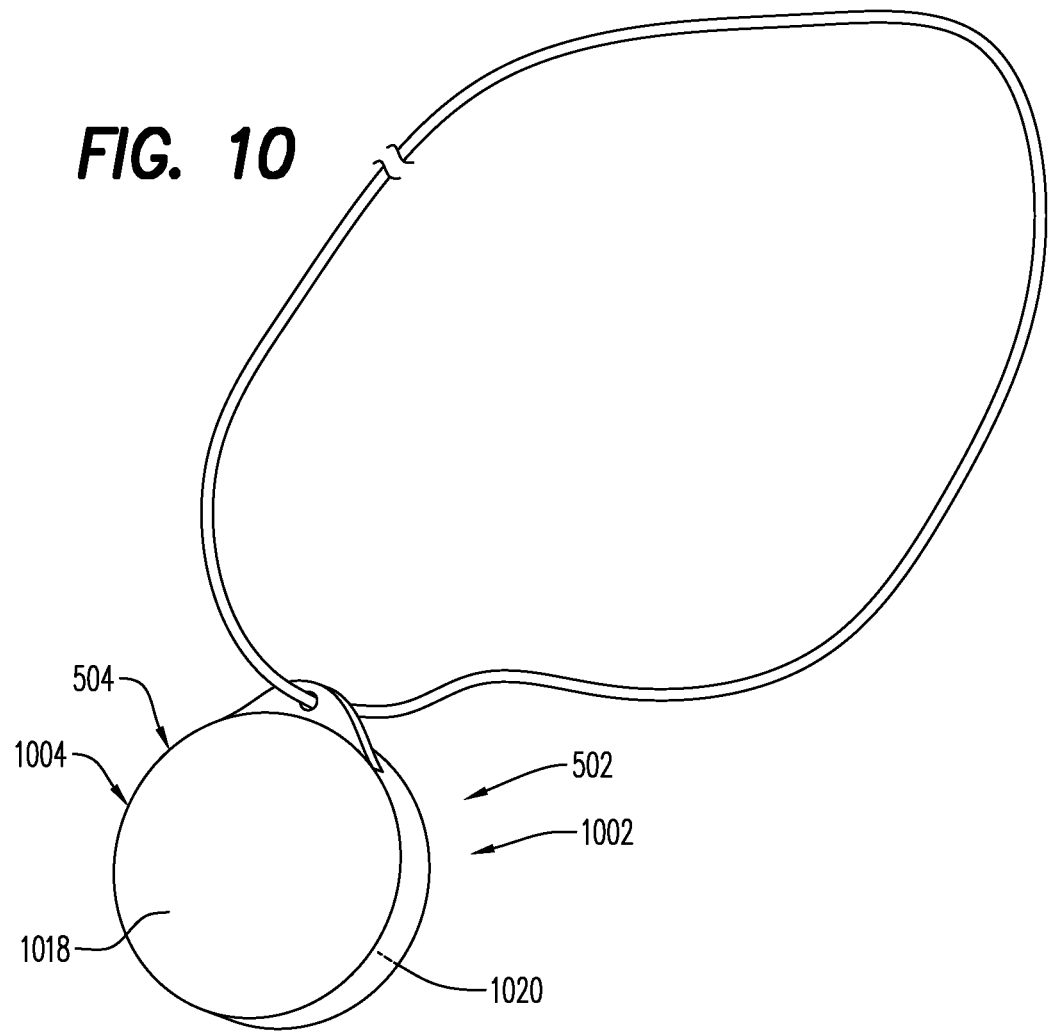
FIG. 10 is a perspective view of a proximity payment device, according to some embodiments.

FIG. 10 is a perspective view of a proximity payment device 502 that comprises a pendant 1002, according to some embodiments. Referring to FIG. 10, the pendant 1002 may include a housing 504, which may define a case 1004 of the pendant 1002. The pendant 1002 may further include a band 505 and/or one or more other components (not shown). The band 505 may be secured to the case 1004. The case 1004 may include one or more portions, e.g., a front portion 1018 and a back portion 1020. One or more portions of the case 1004 may be movable relative to one or more other portions of the case 1004 to allow access to an internal chamber of the pendant 1002

In some embodiments, the pendant 1002 may further comprise additional components that are the same as and/or similar to components of one or more embodiments of the proximity payment device 502 described herein, such that the pendant 1002 may operate in a manner that is the same as and/or similar to the manner of operation of one or more embodiments of the proximity payment device 502 described herein.

In some embodiments, the device 502 may not have, and/or may not be used with, a wristband, a neckband, and/or any other type of band.

As stated above, in some embodiments, the small IC card 204 may have dimensions and/or a configuration that are the same as and/or similar to the dimensions and/or the configuration of one or more embodiments of the small IC card 204 disclosed in U.S. patent application Ser. No. 11/852,739, entitled "IDENTIFICATION TOKEN AND METHOD OF MAKING IDENTIFICATION TOKEN", filed in the name of Simon Phillips on even date herewith, the contents of which are hereby incorporated by reference.

Figure 11A:
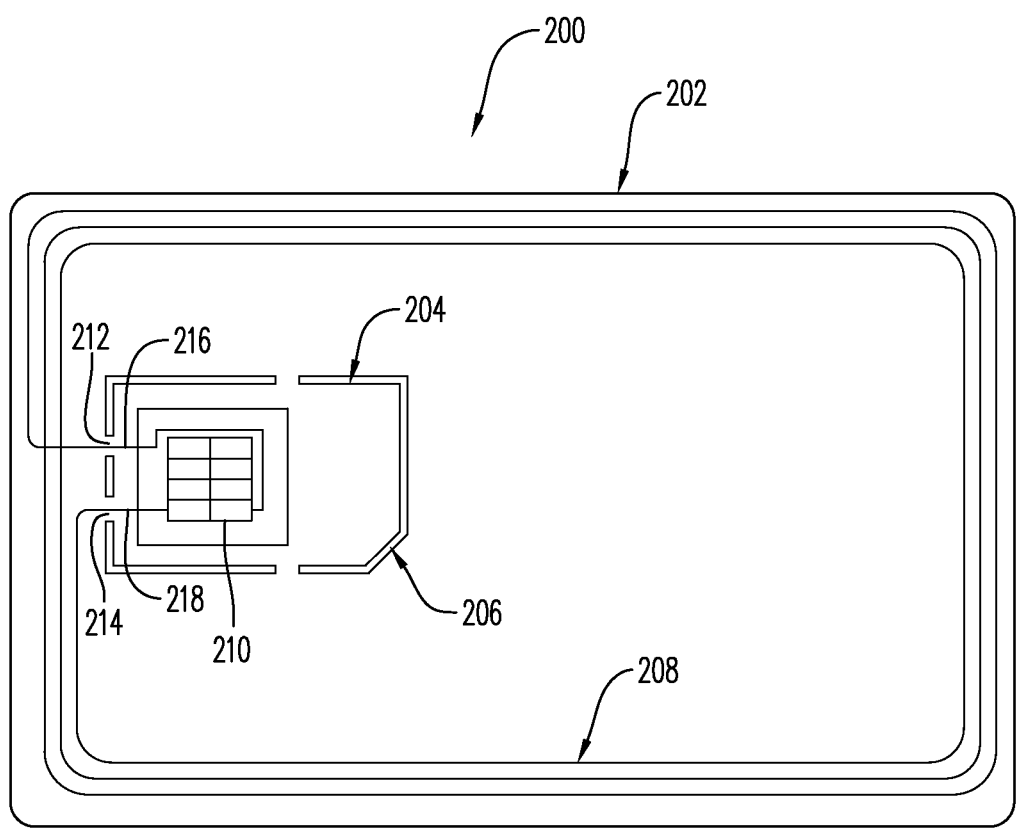
FIG. 11A is a plan view of a structure that includes a small IC card blank and a larger carrier for the small IC card blank, in accordance with some embodiments.

FIG. 11A is a plan view of a structure 200 that includes a small IC card blank and a larger carrier for the small IC card blank, in accordance with some embodiments. Referring to FIG. 11A, in accordance with some embodiments, the structure 200 is similar to the structure 200 described above with respect to FIGS. 1-2 except that (i) the small IC card blank 204 has a position and a configuration that are different than the position and the configuration, respectively, of the small IC card blank 204 illustrated in FIGS. 1-2, (ii) the antenna 208 has a position and a configuration that are different than the position and the configuration, respectively, of the antenna 208 illustrated in FIGS. 1-2 and (iii) bridges 212, 214, 215 have positions and configurations that are different than the positions and configurations, respectively, of the bridges 212, 214, 215, respectively, illustrated in FIGS. 1-2.

Figure 11B:
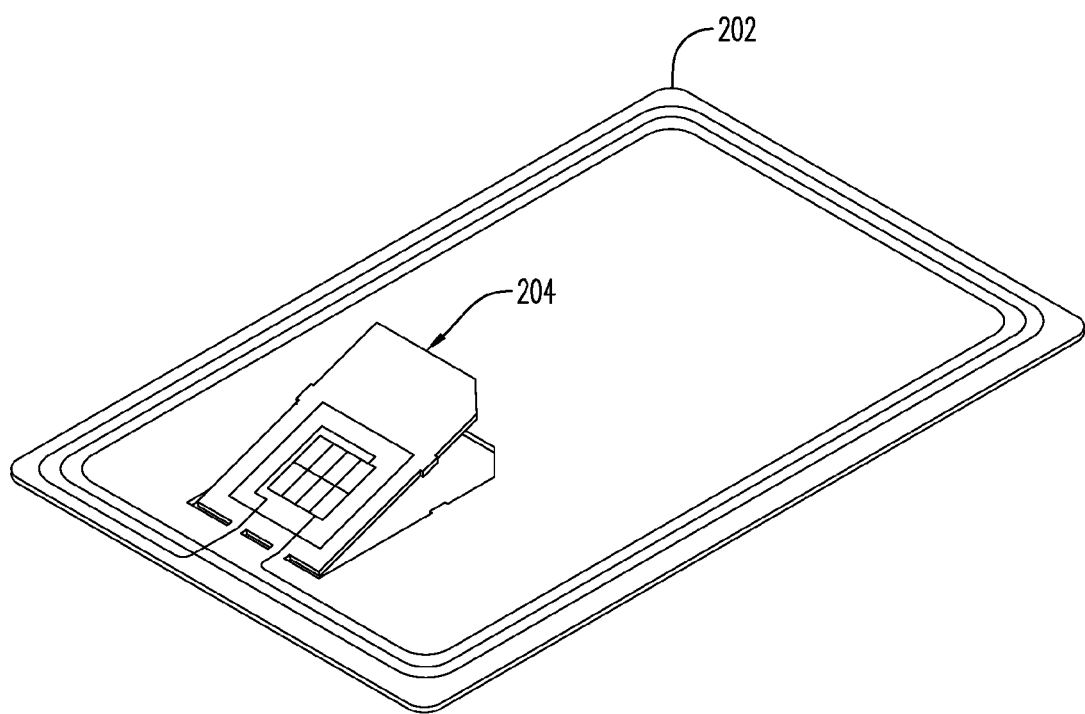
FIG. 11B is a perspective view of the structure of FIG. 11A as the small IC card is being detached from the carrier.

FIG. 11B is a perspective view of the structure of FIG. 11A as the small IC card is being detached from the carrier.

Figure 12:
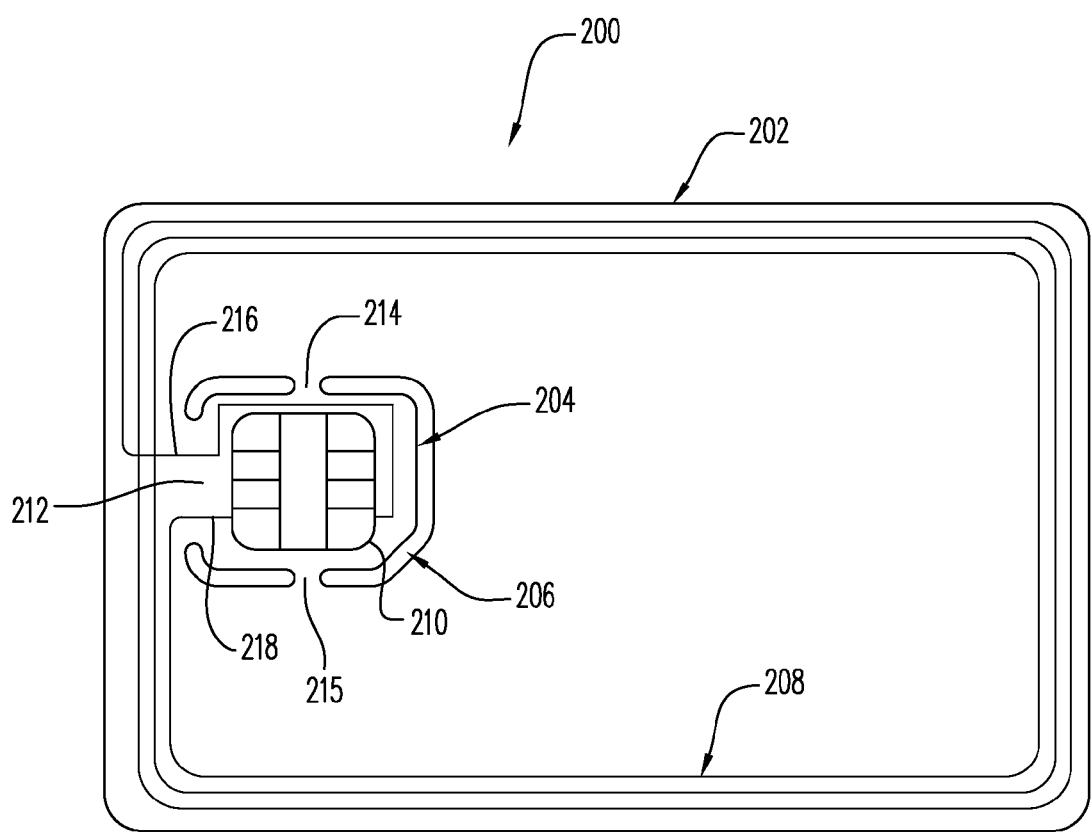
FIG. 12 is a plan view of a structure that includes a small IC card blank and a larger carrier for the small IC card blank, in accordance with some embodiments.

FIG. 12 is a plan view of a structure 200 that includes a small IC card blank and a larger carrier for the small IC card blank, in accordance with some embodiments. Referring to FIG. 12, in accordance with some embodiments, the structure 200 may be similar to the structure 200 described above with respect to FIGS. 1-2 except that (i) the small IC card blank 204 has a position that is different than the position of the small IC card blank 204 illustrated in FIGS. 1-2, (ii) the antenna 208 has a position and a configuration that are different than the position and the configuration, respectively, of the antenna 208 illustrated in FIGS. 1-2 and (iii) bridges 212, 214, 215 have positions and configurations that are different than the positions and configurations, respectively, of the bridges 212, 214, 215, respectively, illustrated in FIGS. 1-2.

FIG. 13A is a perspective view of a proximity payment device 502 according to some embodiments. Referring to FIG. 13A, the proximity payment device 502 may include a body 504. The body may define a case 1304, which may enclose an antenna 506, a battery 1334, a controller 1335 and/or one or more other components of the proximity payment device.

The case 1304 may include one or more portions, e.g., a front portion 1318 and a back portion 1320. One or more portions of the case 1304 may be movable relative to one or more other portions of the case 1304 to allow access to an internal chamber 1321 of the proximity payment device 502. For example, one side of the back portion 1320 may be retained by a hinge 1323 and the other side of the back portion 1320 may be retained by a releasable catch 1325, such that upon releasing the releasable catch, one side of the back portion 1320 may be free to pivot away from the rest of the case 1304.

Figure 13B:
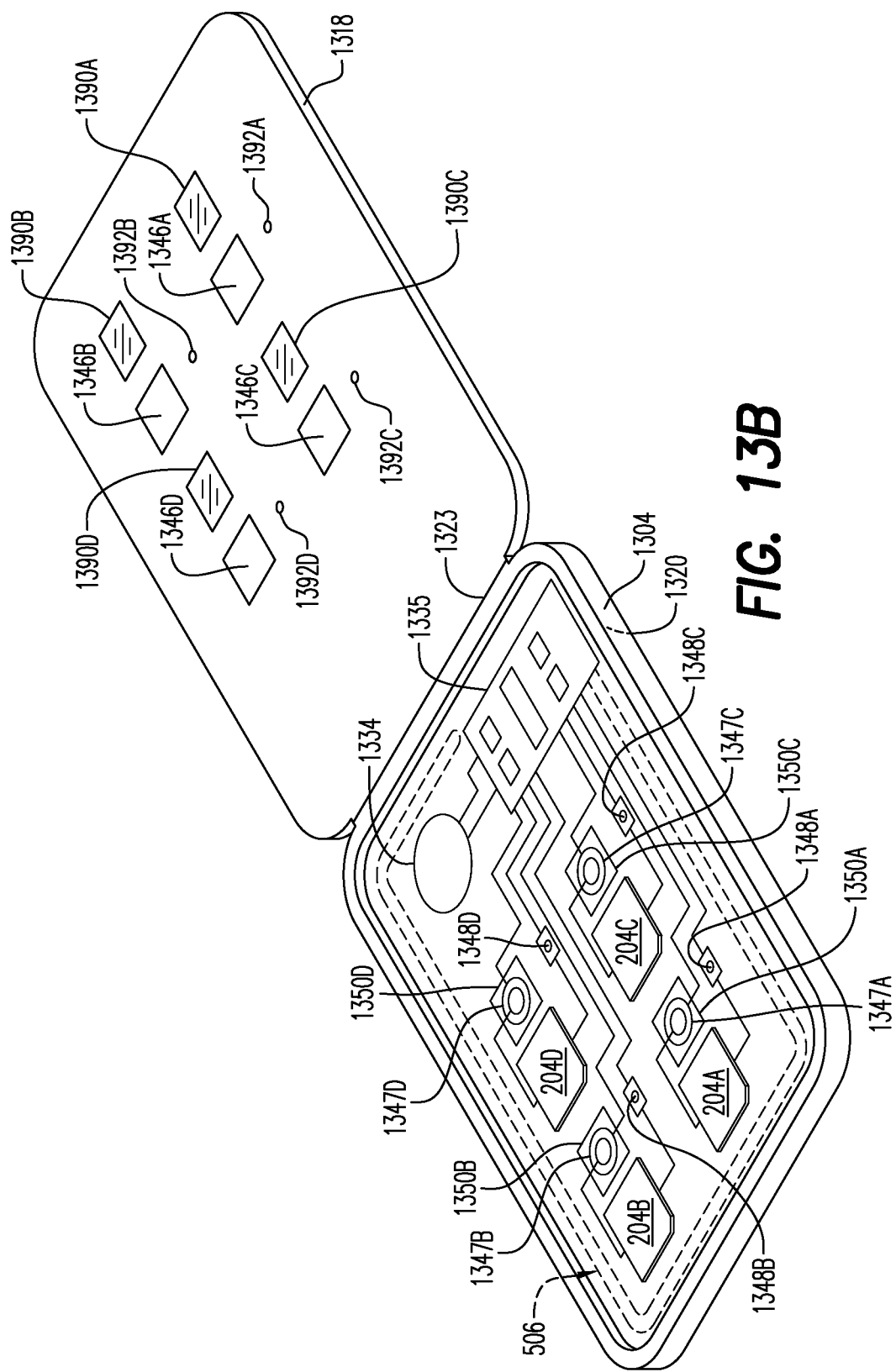
FIG. 13B is a schematic, perspective view of a portion of the proximity payment device of FIG. 13A, according to some embodiments, with a case component of the device in an open state.

FIG. 13B is a schematic, perspective view of a portion of the proximity payment device 502, according to some embodiments, with the case 1304 in an open state.

Figure 13C:
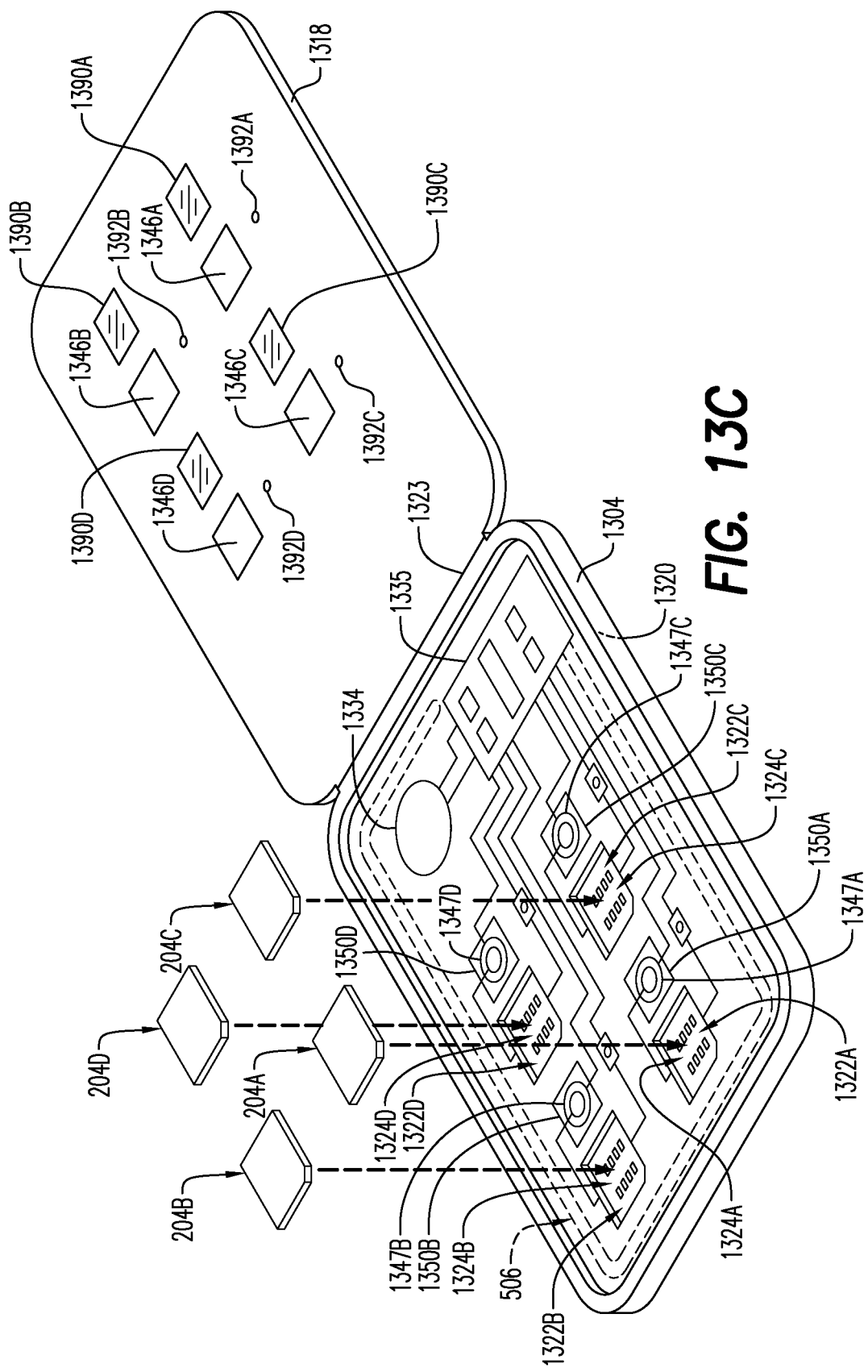
FIG. 13C is a schematic, partially exploded perspective view of a portion of the proximity payment device of FIG. 13A, according to some embodiments, with the case component in an open state and IC card components uninstalled.

FIG. 13C is a schematic, partially exploded perspective view of a portion of the proximity payment device 502, according to some embodiments, with the case 1304 in an open state and the small IC cards 204A-204D uninstalled.

Figure 13E:
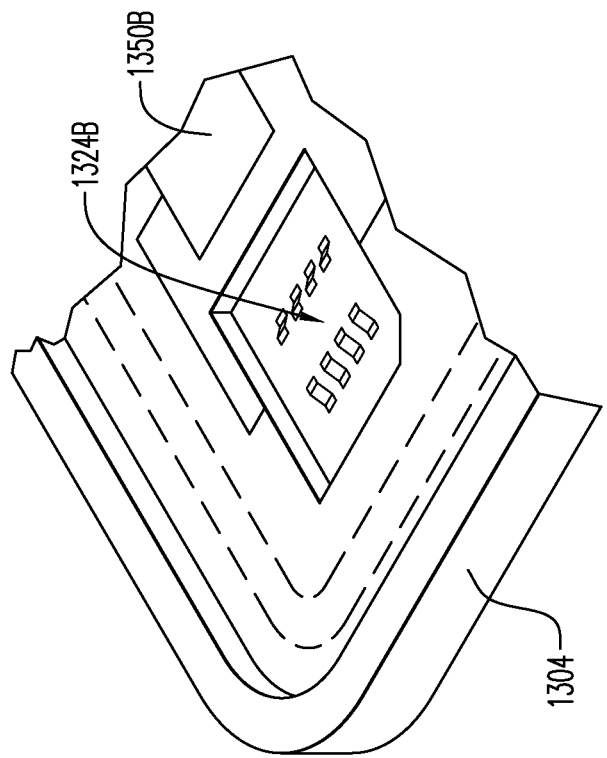
FIG. 13E is similar to FIG. 13D, but shows an alternative embodiment of the proximity payment device.
Figure 13D:
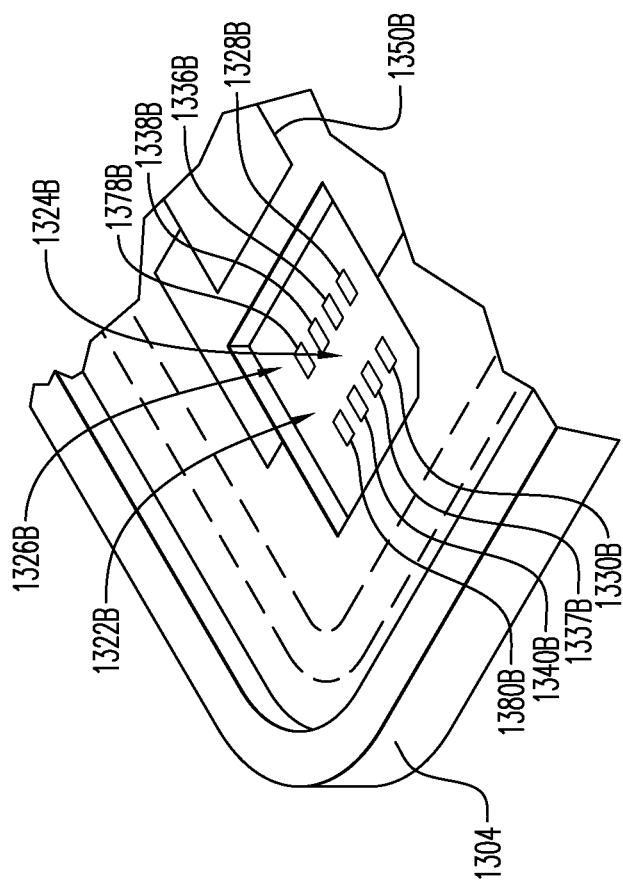
FIG. 13D is an enlarged schematic plan view of a portion of the proximity payment device of FIG. 13A.

FIG. 13D is an enlarged schematic plan view of a portion of the proximity payment device 502, according to some embodiments, with the case removed and the small IC cards uninstalled.

Referring to FIGS. 13B-13D, in some embodiments, the proximity payment device 502 may be adapted to receive one or more small IC cards 204. In that regard, the proximity payment device 502 may comprise a substrate 1344. The substrate 1344 may define four holders 1322A-1322D and four electrical interfaces 1324A-1324D adapted to receive four small IC cards 204A-204D. In some embodiments, each of the holders 1322A-1322D and each of the electrical interfaces 1324A-1324D may be the same as and/or similar to (i) the holder 522 and the electrical interface 524 of the proximity payment device 502 described hereinabove with respect to FIG. 5 and/or (ii) the holders 722A-722B and the electrical interfaces 724A-724B of the proximity payment device 502 described hereinabove with respect to any one or more of FIGS. 7A-7F, 8A-8F.

For example, a second holder 1322B may include a seat 1326B adapted to receive a small IC card 204B and to support and/or position the small IC card 204B relative to the electrical interface 1324B, at least in part. The second electrical interface 1324B may include first and second contacts 1328B, 1330B, which may be adapted to contact the contacts 508, 510, respectively, of the IC 210 of the small IC card 204B. The contacts 1328B, 1330B may also electrically connect to the antenna 506, to thereby electrically connect the antenna 506 to the contacts 508, 510 of the IC 210 of the small IC card 204B.

The contacts 1328B, 1330B may be biased (e.g., in the z direction) so as to help insure contact with respective contacts of the IC 210 of the small IC card 204B. Referring also to FIG. 13E, in some embodiments, each of the contacts 1328B, 1330B may comprise a spring contact that includes a contact and a spring integral therewith to bias the spring contact (e.g., in the z direction). One or more springs may be provided on one or more portions of the case 1304 to bias the small IC card 204B toward the holder 722B.

In some embodiments, the holder 1322B, the electrical interface 1324B, the seat 1326B, and contacts 1328B, 1330B may be the same as and/or similar to the holder 722, the electrical interface 724, the seat 726 and contacts 728, 730, respectively, of the proximity payment device 502 described hereinabove with respect to FIG. 5.

Each small IC card 204A-204D may be secured in its respective holder in any suitable manner, for example, but not limited to, mechanically (e.g., press fit, physical stops, springs). The length, width and/or depth provided for one small IC card may be the same as or different from the length, width and/or depth provided for one or more other small IC cards.

The substrate 1344 may further define a plurality of electrically conductive elements 1346 that provide one or more of the electrical connections described herein.

As stated above, in some embodiments, the proximity payment device 502 may further include a power source, e.g., a battery 1334. In some embodiments, the battery may be the same and/or similar to the battery 734 of the proximity payment device 502 described hereinabove with respect to any one or more of FIGS. 7A-7F, 8A-8F. The power source 1334 may be disposed on the substrate 1344 and/or at any other suitable location.

The IC 210 of one or more of the small IC cards 204A, 204B may be adapted to be connected to such power source. In some embodiments, each of the electrical interfaces 1324A-1324D may be the same as and/or similar to the electrical interfaces 724A-724B, of the proximity payment device 502 described hereinabove with respect to FIG. 7E.

For example, the electrical interface 1324B may further include third and fourth contacts 1336B, 1337B, which may be adapted to contact the contacts of the IC 210 of the small IC card 204B that are adapted to be connected to and/or receive electrical power from the power source 1334. The contacts 1336B, 1337B may also electrically connect to the power source 1334, to thereby electrically connect the power source 1334 to the contacts of the IC 210 of the small IC card 204B that are adapted to be connected to and/or receive electrical power from the power source 1334. The contacts 1336B, 1337B may be biased (e.g., in the z direction) so as to help insure contact with respective contacts of the IC 210 of the small IC card 204B. In some embodiments, each of the contacts 1336B, 1337B may comprise a spring contact that includes a contact and a spring integral therewith to bias the spring contact (e.g., in the z direction).

As stated above, access to a source of electrical power may improve one or more operating characteristics of the device. In some embodiments, access to a source of electrical power may give the proximity payment device a greater range. If the proximity device has a greater range, it may not need to be positioned as close to the proximity coupling device. In some embodiments, access to a source of electrical power may allow the device to perform a greater number of functions and/or may increase the operating speed of the device.

The proximity payment device 502 may further include a controller. In some embodiments, the controller may be same and/or similar to the controller 735 of the proximity payment device 502 described hereinabove with respect to any one or more of FIGS. 7A-7F, 8A-8F. The controller 1335 may be disposed on the substrate 1344 and/or at any other suitable location.

The IC 210 of one or more of the small IC cards 204A, 204B may be adapted to be connected to the controller 1335. In some embodiments, each of the electrical interfaces 1324A-1324D may be the same as and/or similar to the electrical interfaces 724A-724B, of the proximity payment device 502 described hereinabove with respect to FIG. 7F.

To that effect, the electrical interface 1324B may include fifth and sixth contacts 1338B, 1340B which may be adapted to contact the contacts of the IC 210 of the small IC card 204B that are adapted to be connected to the controller 1335. The contacts 1338B, 1340B may also electrically connect to the at least one circuit 1335, to thereby electrically connect the controller 1335 to the contacts of the IC 210 of the small IC card 204B that are adapted to be connected thereto. The contacts 1338B, 1340B may be biased (e.g., in the z direction) so as to help insure contact with respective contacts of the IC 210 of the small IC card 204B. In some embodiments, each of the contacts 1338B, 1340B may comprise a spring contact that includes a contact and a spring integral therewith to bias the spring contact (e.g., in the z direction).

In some embodiments, the controller 1335 may receive and/or may supply information that is the same as and/or similar to the information that may be received and/or may be supplied by the controller 735 described hereinabove with respect to any one or more of FIGS. 7A-7F, 8A-8F.

In some embodiments, proximity payment device 502 may further include a display (not shown) that may be the same and/or similar to the display 708 of the proximity payment device 502 described hereinabove with respect to any one or more of FIGS. 7A-7F, 8A-8F. In some embodiments, such display may receive and/or may supply information that is the same as and/or similar to the information that may be received and/or may be supplied by the display 708 described hereinabove with respect to any one or more of FIGS. 7A-7F, 8A-8F.

In some embodiments, each of small IC cards 204A-204D may be enabled at all times so as to be capable of being operated at times. Indeed, in some embodiments, each of small IC cards 204A-204D may be operated concurrently. In some other embodiments, each small IC card 204A-204D may be enabled only at selected times.

In that regard, in some embodiments, the proximity payment device 502 may include tactile input devices 750A-750D to enable selective operation of one or more of the small IC cards 204A-240D. For example, a first tactile input device 1350A may enable selective operation of the first small IC card 204A. A second tactile input device 1350B may enable selective operation of the second small IC card 204B. A third tactile input device 1350C may enable selective operation of the third small IC card 204C. A fourth tactile input device 1350D may enable selective operation of the second small IC card 204D. The tactile input devices 1350A-1350D may be disposed on the substrate or at any other suitable location(s).

In some embodiments, actuating the first tactile device 1350A may cause the controller 1335 to supply a signal to close a switch to connect the first small IC card 204A to the antenna 506 and/or to close a switch to connect the first small IC card 204A to the power source 1334. And so on. In some embodiments, one or more of the switches controlled by the controller 1335 may be disposed in the controller 1335.

In some other embodiments, the tactile input devices 1350A-1350D may be electrically connected in series between the controller 1335 and small IC cards 204A-204D, respectively.

In some embodiments, the tactile input devices 1350A-1350D may comprise push on/push off type switches and/or momentary type switches. Examples of such types of switches include but are not limited to KMX series microminiature tactile switches, ED DOME tactile switches and/or EDM DOME tactile switches produced by ITT Corporation.

In some embodiments, tactile input devices 1350A-1350D may comprise film type tactile switches. A film switch may include a first portion 1346 and a second portion 1347. The first portion 1346 of the film switch may be disposed on the first portion of the case 1304. The second portion 1347 of the film switch may be disposed on the substrate 1344. The first portion may define a conductive pad. The second portion may define two concentric conductors. In some embodiments, the tactile input devices 1350A-1350D may be electrically connected in series between the controller 1335 and the small IC cards 204A-204B. If a tactile input device is electrically connected in series between the controller 1335 and a small IC card, one of the concentric conductors may be electrically connected to an electrically conductive element 1345 that is electrically connected to electric interface 1324 for the small IC card. The other concentric conductor may be electrically connected to an electrically conductive element 1345 that is electrically connected to the controller 1335.

Other types of tactile input devices and/or other configurations employing the tactile input devices may also be used. The tactile input devices 1350A, 1350B may or may not be identical to one another.

In some embodiments, the case 1304 may define one or more openings and/or movable portions 1390A-1390D, which may be disposed in register with one or more of the tactile input devices 1350A-1350D, to allow one or more of the tactile input devices 1350A-1350D to be depressed, directly and/or indirectly.

In some embodiments, one or more indications may be provided on movable portions 1390A-1390D to indicate and inform a user where the user should press with his/her finger to actuate a switch.

In some embodiments, one more springs may bias the one or more small IC cards 204A-204D away from the respective electrical interface 1324A-1324D, such that the one or more small IC cards 204A-204D do not contact the respective electrical interface 1324A-1324D unless the one or more small IC cards 204A-204D are depressed, directly and/or indirectly.

In some embodiments, printed information includes an indication of a location of a switch or other type of input device. Thus the indication may indicate to the cardholder (the user) where the user should press with his/her finger to actuate a switch. In some embodiments, the indication may be provided on the body of the proximity payment device. If the body defines a case the indication may be provided on such case. If the proximity payment device includes a display, the indication may be provided on the display. In some embodiments, the indication may be provided on the small IC card 204. In some embodiments, one or more of the cards may include information thereon and a back portion of the case and/or another portion of the case may be transparent and/or open to allow the information to be read.

In some embodiment, the device 502 may include one or more indicators 1348A-1348D. In some embodiments, the indicators 1348A-1348D may indicate whether one or more of the small IC cards 204A-204D, respectively, is enabled. In that regard a first indicator 1348A may indicate whether a first small IC card 204A is enabled. A second indicator 1348B may indicate whether a second small IC card 204B is enabled. A third indicator 1348C may indicate whether a third small IC card 204C is enabled. A fourth indicator 1348D may indicate whether a fourth small IC card 204D is enabled.

In some embodiments, each of the indicators 1348A-1348D provides a visible indication. In some embodiments, a visible indication may comprise a blinking indication. In some embodiments, the indication may indicate whether one or more of the small IC cards 204A-204D is enabled. In some embodiments, the indicators 1348A-1348D may comprise a light bulb, a light emitting diode (LED) and/or any other suitable device.

In some embodiments, the indicators 1348A-1348D may be electrically connected in series between the controller 1335 and the small IC cards 204A-204D, respectively. Other configurations may also be employed.

In some embodiments, each small IC card of the small IC cards 204A-204D may be disposed (i) in register with and/or adjacent to the tactile input device associated with such small IC card and/or (ii) in register with and/or adjacent to the indicator associated with such small IC card.

In some embodiments, the case 1304 may define one or more openings and/or sufficiently transparent portions 1392A-1392D, which may be disposed in register with one or more of the indicators 1348A-1348D, to allow the indicators 1348A-1348D to be seen therethrough.

In some embodiments, indicators 1348A-1348D may comprise audio indicators and/or vibratory indicators in addition to and/or in lieu of indicators that provides a visible indication. An audio indicator may provide an audible indication and/or a beeping audible indication. A vibratory indicator may provide a vibratory indication.

In some embodiments, one or more indications may be provided on the case 304 and/or the indicators 1348A-1348D to indicate which small IC card is associated with an indicator.

In some embodiments, the case 1304 may define one or more openings and/or sufficiently transparent portions 1398A-1398D, which may be disposed in register with one or more of the small IC cards 204A-204D to allow the small IC cards 204A-204D to be seen therethrough.

In some embodiments, one or more of the small IC cards 204A-204D may have information on a surface thereof to identify the small IC card 204A-204D.

In some embodiments, the case 1304 may define one or more openings and/or sufficiently transparent portions 1398A-1398D, which may be disposed in register with one or more of the small IC cards 204A-204D to allow the small IC cards 204A-204D and/or information thereon to be seen therethrough.

In some embodiments, the ability to see the small IC cards 204A-204D and/or information thereon may inform the user which of the tactile input devices 1350A-1350D should be actuated to enable a particular one of the small IC cards 204A-204D. In some embodiments, the ability to see the small IC cards 204A-204D and/or information thereon may inform the user which of the one of the small IC cards 204A-204D is enabled.

In some embodiments, one or more of the small IC cards 204A-204D may include an antenna.

In some embodiments, the contact pads of the small IC card 204 may define a contact interface that is the same as and/or similar to a conventional smart card that includes a contact interface.

In some embodiments, the contact interface comprises a contact interface in accordance with (i) a T=1 protocol (sometimes referred to as a T0 protocol or T0 standard) defined by the ISO/IEC standard 7816-4, promulgated by the International Standardization Organization and other bodies and/or (ii) a T=0 protocol (sometimes referred to as a T1 protocol or T1 standard) defined by the ISO/IEC standard 7816-4, promulgated by the International Standardization Organization and other bodies.

Each portion of proximity payment device 502 may comprise any type of material(s) and may have any configuration and/or construction. Thus, for example, the case 1304 may comprise any type of material(s) and may have any configuration and/or construction. In some embodiments, the case may comprise a metal, ceramic, glass, plastic, fiber, silicon, semiconductor, and/or a combination thereof. Likewise, a holder 1322 and/or seat 1326 may have any configuration (e.g., shape and/or size) including for example, rectangular, cylindrical, elliptical, conical, irregular and/or any combination thereof. In some embodiments, the configuration may be based on the configuration of the small IC card to be received and/or any other consideration(s) or combination thereof.

The proximity payment device may have any number of holders and electrical interfaces to receive any number of small IC cards. Thus, in some embodiments, the proximity payment device 502 may have more than two holders and more than two electrical interfaces to receive more than two small IC cards.

If the proximity payment device has more than one holder, such holders may be fabricated separate from one another, integral with one another and/or any combination thereof. Each of the holders may be coupled to one, some or all of the other holders, as shown, or completely isolated from the other holders.

If the proximity payment device has more than one seat, such seats may be spaced apart from one another in one or more directions. In some embodiments, seats may be disposed in a linear array and spaced apart from one another in the x direction (and/or y direction). In some other embodiments, the seats may be disposed in a two dimensional array having a plurality of rows and/or columns. Thus, one or more of the seats may be spaced apart from one or more other seats in the x direction and/or y direction. In some embodiments, the seats may be disposed in a stack so as to be spaced apart from one another in the z direction. In some embodiments, the stack may define a linear array in the z direction.

Although back portions 720, 920 and 1020 are not shown as being transparent, in some embodiments, any or all of such back portions 720, 920 and 1020 may be transparent.

Although information is not shown printed on some small IC cards 204 in some embodiments any or all of such small IC cards 204 may have information printed thereon.

In some embodiments one or more of the circuits of the proximity payment device may include an enable line that may be used to enable and/or disable the proximity payment device. In some embodiments, methods in addition to and/or in lieu of those described herein may be employed to enable and/or disable the proximity payment device.

One or more of the proximity payment devices may also have a contact interface like that of a conventional smart card that includes a contact interface.

As used herein and in the appended claims, "proximity payment device" refers to any device, of any shape, which transmits to a point of sale terminal, by wireless transmission, a payment account number. As used herein and in the appended claims, a payment account number may be numeric, non numeric and/or a combination thereof.

The principles taught herein have heretofore been described in the context of proximity payment devices. Nevertheless, these teachings are also applicable to any type of identification token. As used herein and in the appended claims the term "identification token" refers to a device, of any shape, that serves as one or more of a proximity payment device, a transportation related device, an identification device, an RFID-enabled passport and/or a source of any type of information associated with a holder of the identification token (and/or the holder of the card installed therein). The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information. As used herein, an account number may be numeric, non numeric and/or a combination thereof.

Notably, the size of the IC card compared to the rest of the structure may be different than shown. In some embodiments, the IC card may be the same size as the rest of the structure to which it is attached or even larger than the rest of the structure to which it is attached.

As used herein, the term surrounding includes both completely surrounding and partially surrounding. Thus, a surrounding card may be a completely surrounding card and/or a partially surrounding card.

Thus, in accordance with some embodiments, information other than a payment card account number (or portion thereof) that was (or is to be) stored in the IC 210 may be printed on a surface of the small IC card 204. In some embodiments, the printing may be by use of the above-mentioned Datacard 9000 equipment or by another suitable device with printing capabilities. In some embodiments, the printed information may comprise one or more portions of a name, a social security number, an account number, an expiration date, a security code and/or medical information.

If a device comprises more than one identification token, zero, one or more of such identification tokens may comprise a proximity payment device.

The above description and/or the accompanying drawings are not meant to imply a fixed order or sequence of steps for any process referred to herein; rather any process may be performed in any order that is practicable, including but not limited to simultaneous performance of steps indicated as sequential.

The proximity payment cards described herein may be considered to be a sort of contactless smart card. The teachings of this application are thus applicable to contactless smart cards generally, as well as to so-called "dual interface" smart cards, which contain a set of contacts on a surface of the card to allow for direct contact interface to a terminal. "Dual interface" smart cards also include an antenna to allow for interfacing to a terminal by wireless transmission of signals.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
    enabling operation of an RFID integrated circuit of a first card in an identification token using a first switch, the identification token including a case body and a battery enclosed within the case body, the first card installed in the case body; and
    enabling operation of an RFID integrated circuit of a second card in the identification token using a second switch, the second card installed in the case body;
    wherein the battery is not part of the first card and is not part of the second card.

2. The method of claim 1 further comprising:
    storing a payment card account number in the RFID integrated circuit of the first card.

3. The method of claim 1, wherein the first card has dimensions that are equal to or less than dimensions defined for a ID000 card/module in ISO/IEC standard 7810.

4. The method of claim 1 further comprising:
    electrically connecting the first switch in series between the RFID integrated circuit of the first card and an antenna for transmitting data; and
    electrically connecting the second switch in series between the RFID integrated circuit of the second card and an antenna for transmitting data.

5. The method of claim 1 further comprising:
    electrically connecting the first switch in series between the RFID integrated circuit of the first card and the battery; and
    electrically connecting the second switch in series between the RFID integrated circuit of the second card and the battery.

6. The method of claim 1 wherein:
    the first switch is actuatable by a user of the identification token; and
    the second switch is actuatable by a user of the identification token.

7. The method of claim 1 further comprising:
    controlling the first switch in response at least to actuation of a first input device actuatable by a user of the identification token; and
    controlling the second switch in response at least to actuation of the second input device actuatable by a user of the identification token.

8. An identification token comprising:
    a case body;
    a battery enclosed within the case body;
    a first card installed in the case body and including an RFID integrated circuit;
    a second card installed in the case body and including an RFID integrated circuit;
    a first switch to enable operation of the RFID integrated circuit of the first card; and
    a second switch to enable operation of the RFID integrated circuit of the second card;
    wherein the battery is not part of the first card and is not part of the second card.

9. The identification token of claim 8, wherein the RFID integrated circuit of the first card stores a payment card account number.

10. The identification token of claim 8 wherein the first card is removable from the identification token and the second card is removable from the identification token.

11. The identification token of claim 8, wherein the first card has dimensions that are equal to or less than dimensions defined for a ID000 card/module in ISO/IEC standard 7810.

12. The identification token of claim 8 further comprising an antenna to transmit data and wherein:
    the first switch is electrically connected in series between the antenna and the RFID integrated circuit of the first card; and
    the second switch is electrically connected in series between the antenna and the RFID integrated circuit of the second card.

13. The identification token of claim 8 wherein:
    the first switch is electrically connected in series between the battery and the RFID integrated circuit of the first card; and
    the second switch is electrically connected in series between the battery and the RFID integrated circuit of the second card.

14. The identification token of claim 8 wherein:
    the first switch is actuatable by a user of the identification token; and
    the second switch is actuatable by a user of the identification token.

15. The identification token of claim 8 further comprising:
    a controller to control the first switch and the second switch.

16. The identification token of claim 8 further comprising:
    a first input device actuatable by a user of the identification token;
    a second input device actuatable by a user of the identification token; and
    and a controller (i) to control the first switch in response at least to actuation of the first input device; and (ii) to control the second switch in response at least to actuation of the second input device.

17. The identification token of claim 8,
    wherein at least one portion of the first card can be seen through at least one portion of the case body; and
    wherein at least one portion of the second card can be seen through at least one portion of the case body.

18. The identification token of claim 8, further comprising:
    an indicator to indicate whether at least one of the RFID integrated circuit of the first card and the RFID integrated circuit of the second card is enabled.

19. The identification token of claim 8, further comprising:
a first indicator to indicate whether the RFID integrated circuit of the first card is enabled; and
a second indicator to indicate whether the RFID integrated circuit of the second card is enabled.

20. An identification token comprising:
a first card including an RFID integrated circuit;
a second card including an RFID integrated circuit;
a first switch to enable operation of the RFID integrated circuit of the first card; and
a second switch to enable operation of the RFID integrated circuit of the second card;
wherein the identification token comprises at least one of a wristwatch, wristband and pendant.

21. The identification token of claim 20, further comprising a battery, and wherein:
the first switch selectively couples the RFID integrated circuit of the first card to the battery; and
the second switch selectively couples the RFID integrated circuit of the second card to the battery.

* * * * *